(12) United States Patent
Schultz

(10) Patent No.: US 10,732,479 B2
(45) Date of Patent: Aug. 4, 2020

(54) DYNAMIC REFRACTIVE INDEX CONTROL FOR BEAM SHAPING UTILIZING VARIABLE ELECTROKINETIC OPTIC

(71) Applicant: ABL IP Holding LLC, Conyers, GA (US)

(72) Inventor: Alexander Jacob Schultz, Sterling, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 244 days.

(21) Appl. No.: 15/993,762

(22) Filed: May 31, 2018

(65) Prior Publication Data
US 2019/0369455 A1 Dec. 5, 2019

(51) Int. Cl.
| | | |
|---|---|---|
| *G02F 1/167* | (2019.01) | |
| *G02B 27/09* | (2006.01) | |
| *G02B 5/02* | (2006.01) | |
| *G02B 1/06* | (2006.01) | |
| *G02B 5/18* | (2006.01) | |
| *G02F 1/1676* | (2019.01) | |

(52) U.S. Cl.
CPC ............ *G02F 1/167* (2013.01); *G02B 1/06* (2013.01); *G02B 5/0242* (2013.01); *G02B 5/0263* (2013.01); *G02B 5/1833* (2013.01); *G02B 27/0961* (2013.01); *G02F 1/1676* (2019.01)

(58) Field of Classification Search
None
See application file for complete search history.

(56) References Cited

U.S. PATENT DOCUMENTS

| | | | | |
|---|---|---|---|---|
| 8,358,322 B2* | 1/2013 | Yeo | ................... | G02F 1/133707 345/107 |
| 9,804,607 B1* | 10/2017 | Coleman | ................. | B23P 11/00 |
| 2011/0304652 A1* | 12/2011 | Korthuis | ................. | G02F 1/167 345/690 |
| 2012/0001842 A1* | 1/2012 | Stellbrink | ............... | G02F 1/167 345/107 |
| 2015/0332637 A1* | 11/2015 | Combs | .................... | G02F 1/169 345/690 |

(Continued)

OTHER PUBLICATIONS

Mukherjee et al., "Electrokinetic Pixels With Biprimary Inks for Color Displays and Color-Temperature-Tunable Smart Windows", Applied Optics, vol. 54, No. 17, Jun. 10, 2015, 8 pages.

*Primary Examiner* — Jennifer D. Carruth
(74) *Attorney, Agent, or Firm* — RatnerPrestia

(57) ABSTRACT

An example fighting device has a luminaire and a driver circuit. The luminaire includes a variable electrokinetic optic that includes an electrokinetic fluid between a transparent substrate and a diffuser. The electrokinetic fluid includes a carrier fluid mixed with charged particles. The variable electrokinetic optic further includes a transparent substrate electrode and a diffuser electrode configured to generate an electric field in the electrokinetic fluid in response to a control voltage applied across the transparent substrate electrode and the transparent diffuser electrode. The electric field attracts the charged particles to adjust an effective birefringence of the variable electrokinetic optic. Increasing the effective birefringence increases an output beam angle of the emitted illumination lighting relative to an input beam angle. The driver circuit selectively controls the applied control voltage.

27 Claims, 13 Drawing Sheets

(56) References Cited

U.S. PATENT DOCUMENTS

2016/0026061 A1\* 1/2016 O'Keeffe ................ G02F 1/167
                                                    359/296
2016/0187756 A1\* 6/2016 Liu ........................ C09D 11/03
                                                    359/296

\* cited by examiner

DYNAMIC REFRACTIVE INDEX CONTROL FOR BEAM SHAPING UTILIZING VARIABLE ELECTROKINETIC OPTIC

TECHNICAL FIELD

The present subject matter relates to a lighting device (e.g., a luminaire) or transducer including a variable electrokinetic optic, with techniques for generating illumination lighting with wide or narrow beam angles utilizing the variable electrokinetic optic.

BACKGROUND

In recent years, a variety of technologies have been developed for electronically controllable beam shaping, for a variety of applications, such as electrically tunable lenses for camera or flash applications. Other configurations of beam shaping devices have been proposed for lighting applications, such as general illumination and vehicle lamps. Several of these technologies for controllable beam shaping have used liquid crystals, which are optically anisotropic. Optically anisotropic materials are said to be birefringent (or birefractive). Birefringence is an optical property of a material having a refractive index that depends on the polarization and propagation direction of light. In optics, the refractive index (or index of refraction) is a dimensionless number that describes how light propagates through that medium Liquid crystal displays utilize liquid crystals to change the birefringence of polarized display in image display applications, but are generally unsuitable for illumination lighting. The liquid crystal material is sandwiched between an input polarizer and output polarizer to form controllable pixels of the display. Typically, liquid crystal displays incorporate a diffuser to spread unpolarized light emitted by a backlight before that unpolarized light enters the input polarizer to undergo polarization prior to entering the liquid crystal material. After passing through the liquid crystal material, the polarized light passes through an output polarizer to form a displayed image. Generally, a diffuser is not coupled to an output surface of the output polarizer because the diffuser would adversely affect quality of the displayed image by mixing the light forming the displayed image outputted by the controllable pixels.

Electrokinetics is a microfluidic phenomenon that refers to several different effects that occur in a heterogenous fluid that contains particles. The particles are solid, liquid, or gas on the scale of micrometers or nanometers. The source of the effects are the influence of an external force, such as an electrical charge, on the particles. Electrophoresis is a specific electrokinetic phenomenon in which an electric field moves the particles. Electrophoresis principles have been used in films for window timing to change the color or darkness/brightness of a window and in electronic-paper display (or e-reader) devices. An example color electrophoretic device for window tinting or e-readers utilizes electrophoresis to attract charged color particles to a top transparent electrode to spread color or to a bottom compact electrode to hide the colored particles in micro-pits, which are adjacent to the bottom compact electrode. In particular, the position of the particles relative to the electrodes and light may turn the pixel white, dark, or somewhere in between, including color state. However, such electrophoretic devices do not operate by changing the refractive index of the electrophoretic fluid to control birefringence, but rather merely bring the charged particles in and out of the field of view (e.g., like a window shutter).

SUMMARY

In an example, a lighting device includes a luminaire. The luminaire includes a light source configured to be driven by electrical power to emit light rays with an input beam angle. The luminaire further includes a variable electrokinetic optic that includes a transparent substrate for inside passage of input light rays emitted from the light source. The transparent substrate includes an input surface coupled to receive the input light rays from the light source. The variable electrokinetic optic further includes a diffuser located at a distance from the transparent substrate. The diffuser includes an output surface to emit light rays for illumination lighting with an output beam angle. The variable electrokinetic optic further includes an electrokinetic fluid between the transparent substrate and the diffuser. The electrokinetic fluid includes a carrier fluid mixed with charged particles. The variable electrokinetic optic further includes a transparent substrate electrode on the transparent substrate. The variable electrokinetic optic further includes a diffuser electrode on or inside the diffuser.

The transparent substrate electrode and the diffuser electrode are configured to generate an electric field in the electrokinetic fluid in response to a control voltage applied across the transparent substrate electrode and the diffuser electrode. The electric field attracts the charged particles to adjust an effective birefringence of the variable electrokinetic optic. Increasing the effective birefringence increases the output beam angle of the emitted illumination lighting relative to the input beam angle. The lighting device further includes a driver circuit. The driver circuit is coupled to the transparent substrate electrode and the diffuser electrode to selectively control the applied control voltage.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

Figure 1:
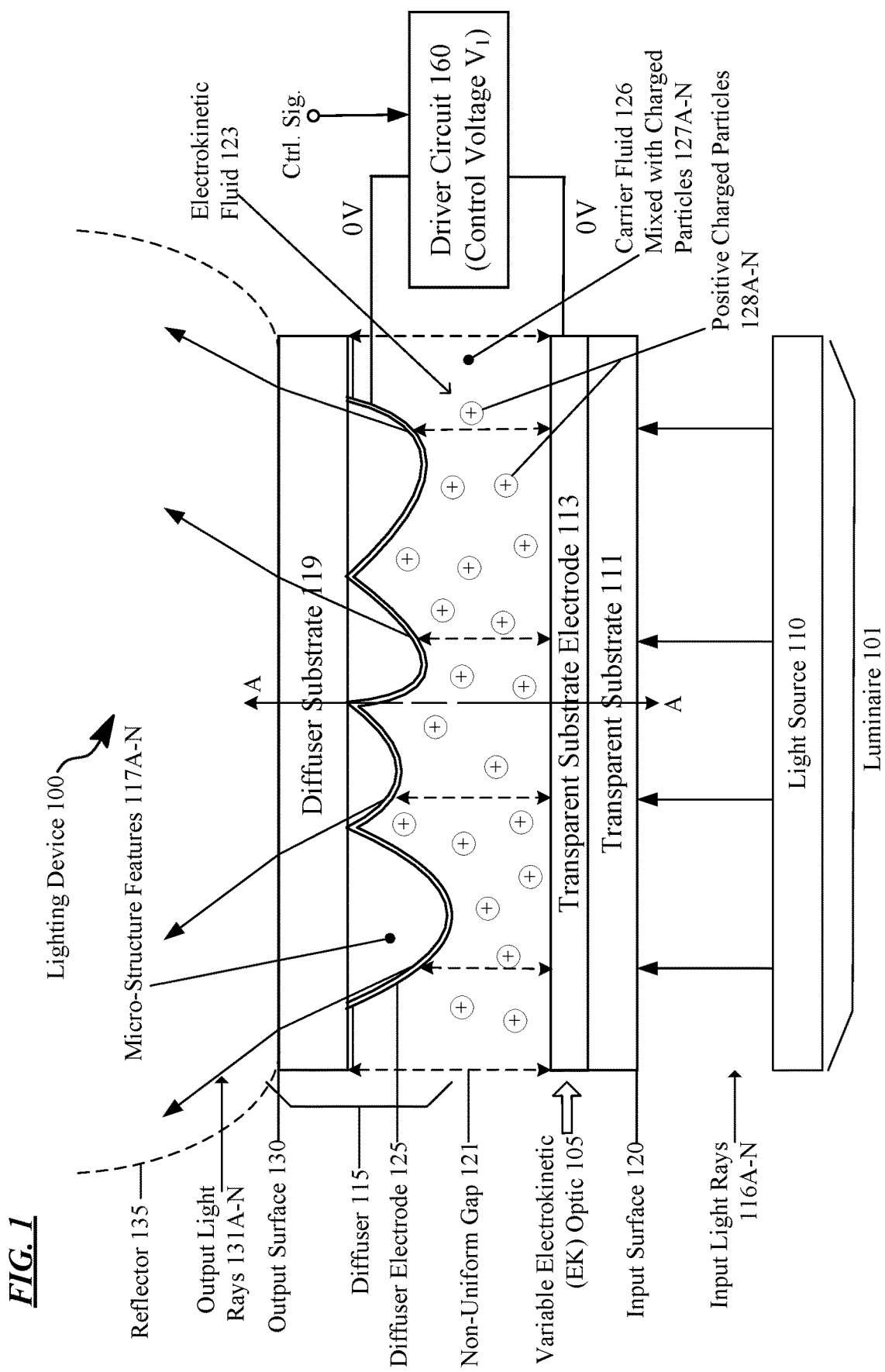
FIG. 1 is a cross-sectional view of a simplified stack for a lighting device, which includes a luminaire having a variable electrokinetic optic using a diffuser, with positive charged particles dispersed in a carrier fluid in a high effective birefringence orientation state to create a high effective birefringence of the variable electrokinetic optic.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Prior systems to adjust a beam pattern (e.g., beam angle or beam shape) for illumination lighting either require moving pans, are limited in range, have temperature range issues, or are expensive to manufacture. The disclosed lighting devices utilize a variable electrokinetic optic that includes electrokinetic fluid (e.g., electrophoretic fluid). The electrokinetic fluid includes a carrier fluid and different dispersed charged particles. The electrokinetic fluid is sandwiched between a transparent substrate and a diffuser. The lighting devices control the different dispersed charged particles within the carrier fluid to vary the effective refractive index of the electrokinetic fluid. Varying the effective refracting index of the electrokinetic fluid adjusts the effective birefringence of the variable electrokinetic optic, which electrically controls the beam pattern of the illumination lighting. The charged particles can have different charges, mobility, and refractive indices to allow the lighting device to move selected particles or mixtures of particles in and out the path of input light rays for illumination lighting emitted from a light source. Adjusting the effective birefringence of the variable electrokinetic optic shapes a light beam, for example, by changing the beam angle of the output light rays for illumination lighting.

The various examples disclosed herein relate to beam shaping optics and devices or systems incorporating one or more such optics, where an electrically controllable beam shaping optic uses electrokinetic fluid and one or more micro-structure type light shaping diffusers. The examples discussed below and shown in the drawings use a non-uniform gap type approach, however, the non-uniformity of the gap can be a result of inclusion of the micro-structure type diffuser surface, which may be fabricated using patterned surface relief. Other diffusers can be utilized that are not patterned surface relief micro-structure type diffusers.

The term "luminaire," as used herein, is intended to encompass essentially any type of device that processes energy to generate or supply artificial light, for example, for general illumination of a space intended for use of occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaires in or on a particular premises have other lighting purposes, such as signage for an entrance or to indicate an exit. In most examples, the luminaire(s) illuminate a space or area of a premises to a level useful for a human in or passing through the space, e.g., of sufficient intensity for general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

Terms such as "artificial lighting" or "illumination lighting" as used herein, are intended to encompass essentially any type of lighting that a device produces light by processing of electrical power to generate the light. A luminaire for an artificial lighting or illumination lighting application, for example, may take the form of a lamp, light fixture, or other luminaire arrangement that incorporates a suitable light source, where the lighting device component or source(s) by itself contains no intelligence or communication capability. The illumination light output of an artificial illumination type luminaire, for example, may have an intensity and/or other characteristic(s) that satisfy an industry acceptable performance standard for a general lighting application.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

The term "substantially matching" or "substantially identical" when comparing an "refractive index," "refractive indices," and "birefringence" means the parameter value varies by up to ±5% from the stated amount. The term "different" when referring to an "refractive index," "refractive indices," and "birefringence" means the parameter value is more than ±5% from the stated amount. The term "substantially unchanged" when referring to "beam angle" means the parameter value varies by up to ±5% from the stated amount.

The term "highly diverged" when referring to "light rays" and "beam angle" means a deviation of 61-90°. The term "intermediately diverged" when referring to "light rays" and "beam angle" means a deviation of 5-60°. The term "upper intermediately diverged" when referring to "light rays" and "beam angle" means a deviation of 31-60°. The term "lower intermediately diverged" when referring to "light rays" and "beam angle" means a deviation of 5-30°. The term "substantially unchanged" and "substantially maintain" when referring to "light rays" and "beam angle" means a deviation of 0-5°.

The term "neutral orientation state" means a state in which none of the charged particles are attracted to any of the electrodes of the variable electrokinetic optic. The term "semi-neutral orientation state" means a partially neutral orientation state in which none of the charged particles are attracted to a specific electrode of the variable electrokinetic optic.

Light output from the luminaire may carry information, such as a code (e.g. to identify the luminaire or its location) or downstream transmission of communication signaling and/or user data. The light based data transmission may involve modulation or otherwise adjusting parameters (e.g. intensity, color characteristic or distribution) of the illumination lighting out of the luminaire.

The orientations of the lighting device, luminaire, associated components and/or any complete devices incorporating a variable electrokinetic optic such as shown in any of the drawings, are given by way of example only, for illustration and discussion purposes. In operation for a particular variable optical processing application, the lighting device and variable electrokinetic optic may be oriented in any other direction suitable to the particular application of the lighting device and the variable electrokinetic optic, for example up light or side light or any other orientation. Also, to the extent used herein, any directional term, such as lateral, longitudinal, left, right, up, down, upper, lower, top, bottom, and side, are used by way of example only, and are not limiting as to direction or orientation of any optic or component of an optic constructed as otherwise described herein.

In the discussion herein, a spot lighting application means a beam pattern with a spot lighting beam angle state, which is a beam angle from 4° to 20°. A flood lighting application means a beam pattern with a flood lighting beam angle state, which is a beam angle from 21' to 120°, but can be broken down into a regular flood lighting application and a wide flood lighting application. A regular flood lighting application means a beam pattern with a regular flood lighting beam angle state, which is a beam angle from 21° to 45°. A wide flood lighting application means a beam pattern with a wide flood lighting beam angle state, which is a beam angle from 45° to 20°. A diffuse lighting application means a beam pattern with a diffuse lighting beam angle state, which is a beam angle of 120° or more.

Reference now is made in detail to the examples illustrated in the accompanying drawings and discussed below. FIG. 1 is a cross-sectional view of a simplified stack for a lighting device 100, which includes a luminaire 101 and a driver circuit 160. Luminaire 101 includes a light source 110 and a variable electrokinetic (EK) optic 105. Light source 110 is configured to be driven by electrical power to emit light rays 116A-N with an input, beam angle. Variable electrokinetic optic 105 includes a transparent substrate 111 for inside passage of input light rays 116A-N emitted from the light source 110. Transparent substrate 111 includes an input surface 130 coupled to receive the input light rays 116A-N from the light source 110.

Variable electrokinetic optic 105 further includes an electrokinetic fluid 123 between the transparent substrate 111 and the diffuser 115 filling a gap, shown as a non-uniform gap 121. As shown, the electrokinetic fluid 123 is sandwiched between the transparent substrate 111 and diffuser 115. Electrokinetic fluid 123 includes a carrier fluid 126 mixed with charged particles 127A-N. In FIG. 1, the charged particles 127A-N are positive charged particles 128A-N, which are set to a volume ratio or percentage to the carrier fluid 126 in the electrokinetic fluid 123. Spreading of the output beam angle of the output tight rays 131A-N relative to the input beam angle of the input light rays 116A-N will depend, in part, on the volume ratio or percentage of the charged particles 127A-N to the carrier fluid 126 and refractive indices, as further described in the formulae below.

Variable electrokinetic optic 105 further includes a transparent substrate electrode 113 on the transparent substrate 111. Variable electrokinetic optic 105 further includes a diffuser electrode 125 on or inside the diffuser 115. Transparent substrate electrode 113 and the diffuser electrode 125 are configured to generate an electric field (shown as broken lines with arrows on the end) in the electrokinetic fluid 123 in response to a control voltage applied across the transparent substrate electrode 113 and the diffuser electrode 125. The electric field attracts the charged particles 127A-N to an oppositely charged electrode to adjust an effective birefringence of the variable electrokinetic optic 105. Increasing the effective birefringence increases the output beam angle of the emitted illumination lighting relative to the input beam angle. Similarly, decreasing the effective birefringence decreases the output beam angle of the emitted illumination lighting relative to the input beam angle. The driver circuit 160 is coupled to the transparent substrate electrode 113 and the diffuser electrode 125 to selectively control the applied control voltage.

The light source 110 includes one or more electrical-to-optical transducers to convert an electrical signal into light output, in other words, transform electrical power into light. A transducer is a device that converts between electrical and optical signals. As explained in more detail in FIG. 13, the variable electrokinetic optic 105 can also be utilized with an optical-to-electrical transducer, such as a photo sensor or a photovoltaic device. More generally, the transparent substrate 111 and the diffuser 115 can be referred to as first transparent substrate 111 and second transparent substrate 115. In an optical-to-electrical transducer example, the first transparent substrate 111 and the second transparent substrate 115 are positioned over an optical-to-transducer transducer to direct light to the optical-to-electrical transducer. Thus, the second transparent substrate 115 is referred to as the transparent input substrate 115 and the first transparent substrate 111 is referred to as the transparent output substrate 111. The illumination light source 110 can be a white light source, but in many applications the illumination light sources 110 can be color controllable (e.g. red, green, and blue).

Although it may have other shapes for some application, in the example, the transparent substrate 111 takes the form of a flat plate in the example. The transparent substrate 111 may be a glass, an acrylic, a plastic (e.g., polyethylene terephthalate), etc. that is sufficiently transparent at least with respect to the wavelength range of light expected to pass through the variable electrokinetic optic 105. For discussion purposes, we will generally discuss glass as die example material of the substrate 111, although other materials such as die noted examples may be used.

Diffuser 115 (e.g., a s micro-structure diffuser or prismatic diffuser) of the variable electrokinetic optic 105 is located at a distance from the transparent substrate 111. The diffuser 115 color mixes the outgoing light rays 131A-N. Diffuser includes an output surface to emit output light rays 131 A-N for illumination lighting with an output beam angle. In the example, the diffuser 115 is a micro-structure diffuser 115. Some of the examples of micro-structure diffusers have convex features, whereas other examples of micro-structure diffusers have concave features. As used here, a "concave" feature is a curved feature that generally curves or extends inward, whereas a convex feature is a curved feature that curves or extends outward.

Diffuser 115 includes a diffuser substrate 119 on which the micro-structure features 117A-N of the beam shaping diffuser film 115 are coated or otherwise formed. In a first example, the diffuser 115 includes a film that includes transparent diffuser substrate 119 and convex micro-structure features 117A-N extending outward from the transparent diffuser substrate 119 toward the non-uniform gap 121. Alternatively, the diffuser 115 includes a transparent diffuser substrate 119 and concave micro-structure features 117A-N formed at a surface of the diffuser substrate 119 facing the non-uniform gap 121.

The diffuser 115 is located at a distance from the transparent substrate 111 to form a non-uniform gap 121 (as indicated by the several dotted line double arrows). The inclusion of the micro-structure diffuser creates the non-uniform gap 121. The non-uniform gap 121 is located between transparent substrate electrode 113 formed on the transparent substrate 111 and the convex micro-structure features 117A-N formed on a substrate 119 of the diffuser 115.

Transparent diffuser electrode 125, for example formed of ITO, is coated on the features of the diffuser film 115 (e.g., micro-structure diffuser), in the example, on surfaces the micro-structure feature surfaces 117A-N opposite the diffuser substrate 119 and lacing the non-uniform gap 121. Alternatively, the diffuser film can be located between the diffuser electrode 125 and the electrokinetic fluid 123 filling the non-uniform gap 121. The opposite part of the cell of the variable electrokinetic optic 105 includes die transparent substrate 111, such as a rigid flat rigid transparent member, for example a glass plate. The transparent substrate electrode 113, for example formed of ITO, is coated on the surface facing the interior of the cell (toward the diffuser electrode 125 of the optic 105).

Substrates 111 and 119, film(s) 117A-N, and electrodes 113 and 115 so formed are assembled into the stack of the variable electrokinetic optic 105 for containing the electrokinetic fluid 123. Electrokinetic fluid 123 is instilled into the interior of the variable electrokinetic optic 105 between the two electrodes 113 and 115, for example, by capillary action. Electrodes 113 and 115 and electrokinetic fluid 123 form a capacitive system in which a voltage across the electrodes 113 and 115 generates charge on the electrodes 113 and 115, creating an electric field in the electrokinetic fluid 123 (and any other dielectric materials) between the electrodes 113 and 115. Charged particles 127A-N in the electrokinetic fluid 123 change orientation and thus an effective refractive index of the electrokinetic fluid 123 in response to changes in the electric field.

Refraction bends light as the light passes from one material to another, where the two materials have different optical properties. The different materials allow light to propagate therethrough at different speeds. The different material properties are typically characterized by a difference in the refractive index of the two materials. For example, passage of light through an interface between two such different materials, from the material permitting the slower propagation speed (higher refractive index) to the material permitting the higher propagation speed (lower refractive index) tends to bend the light away from an axis perpendicular to the interface surface. Changing the voltage and thus the electric field applied to the electrokinetic fluid 123 (e.g., electrophoretic fluid) changes the charged particles 127A-N orientation and thus the refractive index of the electrokinetic fluid 123, thus varies the spread of the output light rays 131A-N forming the light beam. Generally, a higher refractive index of the electrokinetic fluid 123 results in a higher effective birefringence of the variable electrokinetic optic 105, which increases the beam angle and spread of the output light rays 131A-N.

Charged particles 127A-N can include glass spheres with a refractive index (n) of 1.9-2.0. Charged particles 127A-N can include titanium dioxide ($TiO_2$), such as anatase, brookite, rutile, which have a refractive index (n) of 2.488, 2.583, and 2.609, respectively. Charged particles 127A-N can include silica/polymeric with a refractive index (n) of 1.4-1.6. Charged particles 127A-N can include polymethyl methacrylate (PMMA), polystyrene (PS), and polyethyl (PE) with a refractive index (n) of 1.4-1.6. Charged particles 127A-N can include barium titanate with a refractive index (n) of 1.9-2.2. Any of the foregoing examples of charged particles 127A-N can be utilized for positive charged particles 128A-N or negative charged particles 129A-N. Carrier fluid 126 is a non-conductive dielectric optical fluid (e.g., oil), and may vary depending on the material of the transparent substrate 111 and desired characteristics of the variable electrokinetic optic 105.

It should be understood that the refractive indices of the charged particles 127A-N and the refractive index of the matched components of the variable electrokinetic optic 105 (e.g., transparent substrate 111, transparent substrate electrode 113, carrier fluid 126 diffuser electrode 125, and diffuser 115) are selected depending on the desired beam shape. For example, charged particles 127A-N with a lower refractive index may be chosen for a spot lighting application. Alternatively, relatively larger refractive indices may be chosen for the charged particles 127A-N for a flood lighting application, regular flood lighting application, wide flood lighting application, or a diffuse lighting application.

The effective birefringence Δn of the variable electrokinetic optic 105 is a mixture of the charged particles 127A-N, the carrier fluid 126, transparent substrate 111, transparent substrate electrode 113, diffuser 115, and diffuser electrode 125. There are two different component refractive indices to consider in the electrokinetic fluid 123: positive charged particles 128A-N and the carrier fluid 126. The positive charged particles 128A-N have a refractive index of 2.5 ($n_1$=2.5). In the example of FIG. 1, the refractive index of the transparent substrate 111 is 1.51 ($n_s$). The transparent electrode 113, diffuser 115, diffuser electrode 125, and the carrier fluid 126 are index matched with the transparent substrate at 1.51 ($n_2$=$n_s$=1.51). The effective refractive index ($n_{eff}$) of the electrokinetic fluid 123 is specified by the formula:

$$n_{eff}=(y_1n_1+y_2n_2)/(y_1+y_2)$$

Where $y_1$ and $y_2$ are volume ratio of the positive charged particles 128A-N to the carrier fluid 126 in the electrokinetic fluid 123.

Birefringence is quantified as the maximum difference between refractive indices exhibited by a material. Therefore the effective birefringence Δn of the variable electrokinetic optic 105 is specified by:

$$\Delta n = n_{eff} - n_1$$

In a first example, the volume ratio or percent of the positive charged particles 128A-N to the carrier fluid 126 in the electrokinetic fluid 123 is a 1:3 ratio or 25% volume percent of positive charged panicles 128A-N and 75% carrier fluid 126 Then $n_{eff}$(1(2.5)+3(1.51))/(1+3). Thus, $n_{eff}$ is 1.7575. Then Δn=1.7575−1.51. Hence, the effective birefringence Δn is 0.2475.

In a second example, the volume ratio or percent of the positive charged particles 128A-N to the carrier fluid 126 in the electrokinetic fluid 123 is a 1:1 ratio or 50% volume percent of positive charged particles 128A-N and 50% carrier fluid 126. Hence, $n_{eff}$ is 2.005. Thus, the effective birefringence Δn is 0.495.

The two above examples are just a couple of implementations of volume ratios or percentages of the charged particles 127A-N to the carrier fluid 126 in the electrokinetic fluid 123. Other volume ratios or percentages of charged particles 127A-N, including positive charged particles 128A-N, to carrier fluid 126 are possible depending on the implementation, such as 1:2, 1:4, 1:5, 2:1, etc.

Returning to the specific example of FIG. 1, charged particles 127A-N, and in particular the depicted positive charged particles 128A-N are dispersed in the carrier fluid 126 in a high effective birefringence orientation state to create a high effective birefringence of the variable electrokinetic optic 105. As noted above, the transparent substrate 111, diffuser 115, and the carrier fluid 126 have substantially matching refractive indices. The charged particles 127A-N have a different refractive index than the transparent substrate 111, the diffuser 115, and the carrier fluid 123.

In the example of FIG. 1, the charged particles 127A-N are entirely comprised of positive charged particles 128A-N. Positive charged particles 128A-N have a higher refractive index than the carrier fluid 126. Driver circuit 160 selectively controls the applied control voltage $V_1$ at a neutral voltage to increase the effective birefringence of the variable electrokinetic optic 105. The neutral applied control voltage $V_1$ set to the neutral voltage maintains the positive charged particles 128A-N in a neutral orientation state or attains the neutral orientation state, such that none of the positive charged particles 128A-N are attracted to the transparent substrate electrode 113 and the diffuser electrode 125. In the neutral orientation state, the charged particles 128A-N appear to spread uniformly in the carrier fluid 126.

Due to the high effective birefringence, output light rays 131A-N for illumination lighting from the diffuser 115 are highly diverged relative to the input light rays 116A-N to increase the output beam angle relative to the input beam angle. The applied control voltage $V_1$ is set to the neutral voltage at 0 Volts (V), which is the steady state (e.g., off state) of the variable electrokinetic optic 105. In the example of FIG. 1, the neutral voltage may be set to other voltage levels below a threshold voltage ($V_t$), which also result in the neutral orientation state. The neutral voltage neutrally orients the positive charged particles 127A-N in the carrier fluid 126 in the high effective birefringence orientation state, which is a low energy orientation. In this low energy high effective birefringence orientation state, the positive charged particles 128A-N are dispersed homogeneously throughout the carrier fluid 126.

The variable electrokinetic optic 105 also includes a transparent diffuser electrode 125 associated with the micro-structure diffuser 115. Although other placements/configurations of the diffuser electrode 125 may be used in this first example, the diffuser electrode 125 is formed on surfaces of micro-structure features 117A-N of the film type diffuser 115 facing the non-uniform gap 121. Alternatively, a transparent electrode could be deposited on the planar surface of the diffuser substrate 119 opposite the micro-structure features 117A-N such that the diffuser electrode 125 is located in the diffuser 115 between the diffuser substrate 119 and the micro-structure features 117A-N. A reflective electrode at that location may be deposited with metal. In a transmissive optic like that shown in FIGS. 1-8, the electrode at that location would be transparent like the transparent substrate electrode 113. Such placement of the electrode may involve use of a thinner diffuser. For example, the current thickness of the diffuser is about 100 µm; however, if the planar, smooth surface is used for the electrode, the voltage to operate the variable electrokinetic optic 105 would be rather high because of the large thickness of the diffuser substrate 119. However, utilizing a much thinner diffuser film, for example, with a total thickness to the diffuser around 10 or 20 µm, it may he feasible to deposit the electrode onto the planar, smooth surface instead of the surface with the micro-structure features 117A-N.

Transparent substrate electrode 113 is uniformly formed on the transparent substrate 111; and the other transparent diffuser electrode 125 is uniformly formed on surfaces of the features 117A-N of the micro-structure diffuser 115. Various techniques may be used to form the electrodes 113, 125 on the respective surfaces; selection of which, for example, may depend on the particular conductor used to implement each electrode. The diffuser electrode 125 is relatively thin compared to other elements of the variable electrokinetic optic 105 through which light will pass. If sufficiently thin, the diffuser electrode 125 has minimal impact on refraction of light passing through the electrokinetic fluid 123 and the micro-structure diffuser 115. If covered by a protective dielectric coating, such as Parylene C, that coating also is sufficiently thin as to have little or no impact on refraction of light passing through the electrokinetic fluid 123 and the micro-structure diffuser 115. Later discussion of optical properties of the system, such as various refraction index differences for different orientation states of the charged particles 127A-N in the carrier fluid 126, therefore will mainly consider the properties of electrokinetic fluid 123.

Transparent electrodes 113 and 125 may be formed of any suitable conductor that may be configured to provide sufficient transparency with respect to at least the wavelength range of light expected to pass through the variable electrokinetic optic 105. The same materials may be used for both of the electrodes 113 and 125, or the transparent electrodes 113 and 125 may be formed of different materials. Examples of suitable transparent conductor materials for the electrodes 113 and 125 include but are not limited to nano-wire mesh, Indium Tin Oxide (ITO), Aluminum-doped Zinc Oxide (AZO) or other transparent conductive oxide (TCO), metallization layer, etc. If either of the electrodes 113 and 125 is formed of a conductor that may be susceptible to damage due to exposure to or contact with a particular type of electrokinetic fluid 123, the surface of the electrode 113 or 125 facing the electrokinetic fluid 123 in the non-uniform gap 121 may be coated with a transparent dielectric layer, such as Parylene C, although other non-conductive transparent protective materials may be used.

The transparent substrate electrode 113 and diffuser electrode 125 are configured to generate an electric field in the electrokinetic fluid 123 in the non-uniform gap 121, in response to a control voltage (generally denoted $V_c$ unless otherwise noted) applied across the electrodes 113 and 125, for example, by the driver circuit 160. The electric field or lack thereof (e.g., at the neutral voltage of the neutral orientation state) sets orientation of charged particles 127A-N in the carrier fluid 126, and thus the effective refractive index ($n_{\textit{eff}}$) of the electrokinetic fluid 123 filling the non-uniform gap 121. This effective refractive index ($n_{\textit{eff}}$) setting of the electrokinetic fluid 123 is utilized for beam shaping by adjusting the effective birefringence $\Delta n$ of the variable electrokinetic optic 105.

In the neutral orientation state, a higher refractive index of the electrokinetic fluid 123 and hence overall effective birefringence of the variable electrokinetic optic 105 is achieved. When driven with a voltage that does not satisfy (e.g., is below or lower than) the threshold voltage ($V_1$), the effective refractive index ($n_{\textit{eff}}$) of the electrokinetic fluid 123 increases because the charged particles 127A-N are evenly dispersed throughout the electrokinetic fluid 123 in the neutral orientation state. When driven on with a voltage that satisfies (e.g., meets or exceeds) the threshold voltage ($V_t$), the effective refractive index ($n_{\textit{eff}}$) of the electrokinetic fluid 123 remains static as if no charged particles 127A-N exist, because the charged particles 127A-N are effectively a transparent planar surface layer 240 (e.g., microfilm).

Driver circuit 160 applies different values of the control voltage ($V_c$) based On, a control signal (Ctrl. Sig.) input to the driver circuit 160. The control voltage $V_c$, for example, may be a direct current (DC) voltage. The driver circuit 160 responds to different data values or levels of the control signal to apply different values of the control voltage $V_c$ to the transparent substrate electrode 113 and the diffuser electrode 125. The range of control voltages $V_c$ used to operate the variable electrokinetic optic 105 of a particular configuration depends on the desired output beam angle and/or on aspects of the particular configuration of the variable electrokinetic optic 105 (e.g. various materials used for the transparent substrate 111, the electrodes 113 and 125, and the diffuser 115; the size of the non-uniform gap 121; and the type of electrokinetic fluid 123. The driver circuit 160 may include a digital to analog controller, a suitable variable voltage generator, physical switches, solid-state switches, optical isolators, etc. The driver circuit 160 receives the control signal from a higher level control element, examples of which are discussed in more detail later with regard to FIG. 13. Typically, the driver circuit 160 is driven with less than 50 V direct current (DC) depending on which electrodes are being utilized. A microcontroller switches the direct current (DC) on or off.

With a configuration like that shown, light passes through the variable electrokinetic optic 105 around the optical axis represented by the line A-A in FIG. 1. The variable electrokinetic optic 105 is capable of variably processing light passing through the 105 in either direction. Light entering from one side of the variable electrokinetic optic 105 about and generally parallel to the optical axis A-A (e.g. directed up or down toward the optic) is processed for selected focused output directed down or up from the variable electrokinetic optic 105, such as for beam shaping. Of course, light processing works in both directions, therefore light entering from a focal point (e.g., light source 110 or an optical-to-electrical transducer) at angles relative to the optical axis A-A may be controllably output with a focal length or even parallel to the axis, according to the variable voltage setting.

As shown, luminaire 101 further includes an optional reflector 135 coupled to or finned on the output surface 130 of a diffuser 115 to shape a beam pattern of the emitted output light rays 131A-N for illumination lighting. As noted above, a variety of diffuser structures may be used. The example variable electrokinetic optic 105 utilizes a microstructure film for the diffuser 115, where the film includes convex micro-structure features 117A-N formed on a substrate 119 of the diffuser 115. The micro-structure features 117A-N are convex in that they extend out from die substrate 19. Diffuser films of the type illustrated in FIGS. 1-8 are available, for example, from Luminit, LLC. Using available diffuser films, the micro-structure size of the surface features 117A-N of the diffuser 115 may be around 5 µm to 20 µm (compared, for example, to the microlens aperture for typical prior non-uniform gap design that is around hundreds of micron and the correspondingly large curvature needed across such an aperture).

Examples of surface relief micro-structure type light shaping diffusers are disclosed in U.S. patent application Ser. No. 15/643,904, filed Jul. 7, 2017, entitled "Variable Light Shaping Optic Using Liquid Crystals and Surface Relief Micro-Structure Diffuser," the entire contents of which is incorporated by reference herein. The convex micro-structure features 117A-N are similar to micro-lenses in an array or the like, except that the features 117A-N are not as uniform in size or curvature as lenslets off micro-lens array. The features 117A-N, however, have curved shapes similar to lenses. Hence, the convex micro-structure features 117A-N are lens-like but not perfect lenses. In the aggregate, the convex micro-structure features 117A-N exhibit an average effective e diffusion angle, corresponding to an average radius of curvature.

The material of the features 117A-N of the micro-structure diffuser 115 may be the same as or different from the material of the associated diffuser substrate 119. Also, if the substrate 119 of the micro-structure diffuser 115 is sufficiently strong and rigid for the intended application of the variable electrokinetic optic 105, the substrate 119 may be the only substrate needed to support the diffuser and an associated diffuser electrode 125. If additional strength or rigidity are desirable for a particular application, the film type diffuser 115 may be applied to an additional transparent substrate (not shown), such as a glass plate or the like similar to the transparent substrate 111.

Figure 2:
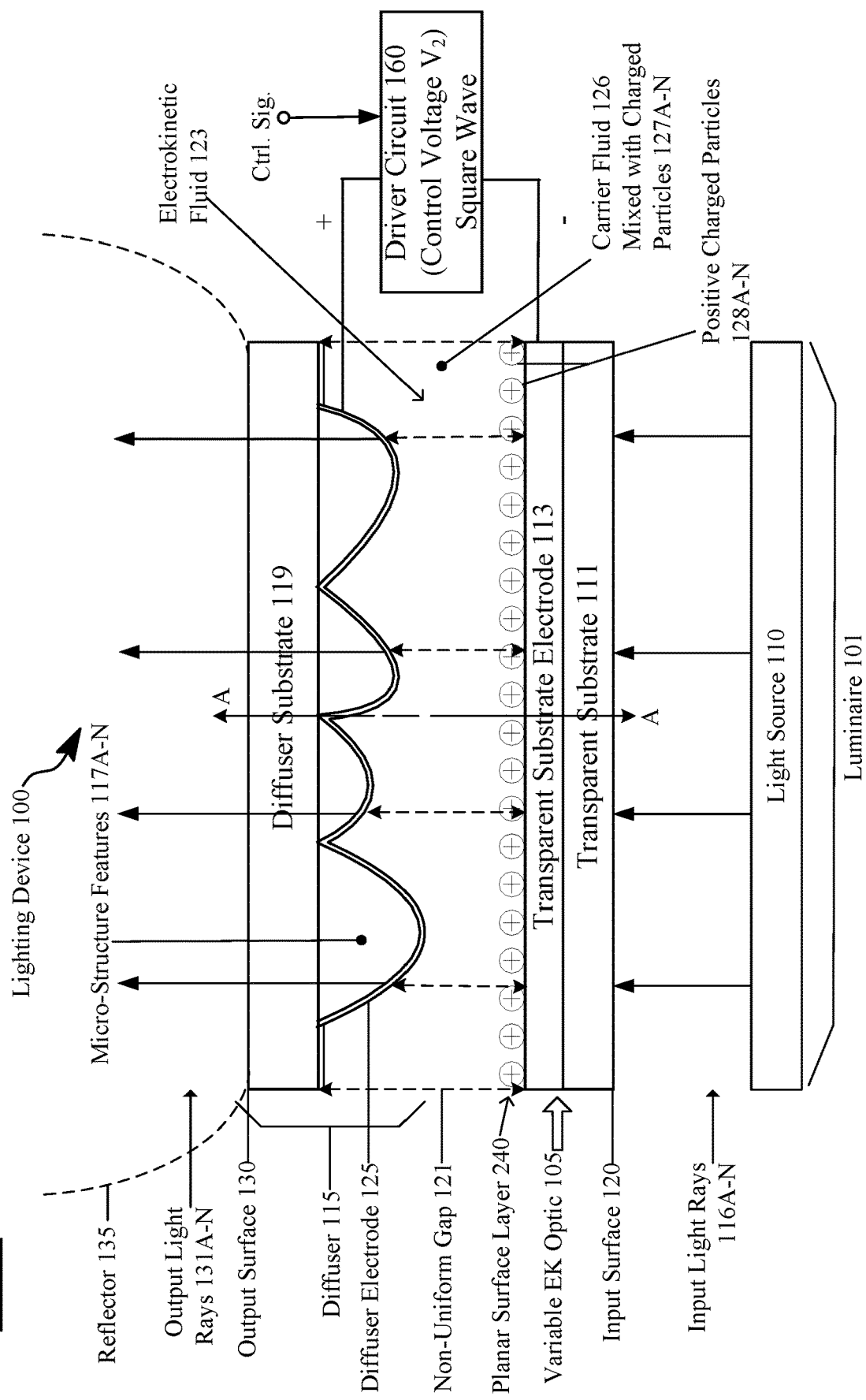
FIG. 2 is another cross-sectional view of the lighting device of FIG. 1, but with the positive charged particles in a low effective birefringence orientation state to create a low effective birefringence of the variable electrokinetic optic.

FIG. 2 is another cross-sectional view of the lighting device 100 of FIG. 1, but with the positive charged particles 129A-N in a low effective birefringence orientation state to create a low effective birefringence of the variable electrokinetic optic 105. As depicted, the charged particles 127A-N include positive charged particles 128A-N. Driver circuit 160 selectively controls the applied control voltage $V_2$ by applying a square wave voltage with a negative polarity to the transparent substrate electrode 113. The charged particles 127A-N are attracted to the opposite polarity. In some examples, the polarities of the applied control voltage $V_2$ on the transparent substrate electrode 113 and the diffuser 115 can be reversed.

The applied control voltage applies a positive polarity to the diffuser electrode 125 and satisfies (e.g., meets or exceeds) the threshold voltage ($V_t$) (to cause the charged particles 127A-N to move and reorient themselves in the carrier fluid 126. When the applied control voltage $V_2$ is at the lower end of satisfying the threshold voltage, charged particles 127A-N will move to reorient in a slow and delayed manner. When the applied control voltage $V_2$ is at the higher end of satisfying the threshold voltage, charged particles 127A-N can move to reorient in a fast and rapid manner.

In FIG. 2, the refractive index of the electrokinetic fluid 143 is just the refractive index of the carrier fluid 126 against curved diffuser layer formed of the micro-structure features 117A-N. The transparent substrate 111 and transparent substrate electrode 113 are both planar layers, with another transparent planar surface layer 240 of positive charged particles 128A-N on top, followed by the carrier fluid 126, the diffuser electrode 125, and alae diffuser 115. The positive charged particles 128A-N are lined up in a minute transparent planar surface layer 240, with a refractive index that becomes negligible. Where there are two parallel surfaces, such as planar surface layer 240 and transparent substrate electrode 113, the input light rays 116A-N do not refract and instead pass straight through relatively unchanged. This is because the two parallel surfaces of the transparent planar surface layer 240 and transparent substrate electrode 113 form an interface that is like one thin film, and thus input light rays 116A-N do not refract when passing through. Because the carrier fluid 126 is index matched to the diffuser 115, the effective birefringence Δn of the variable electrokinetic optic 105 is unchanged.

The resulting electric field from the applied control voltage $V_2$ attracts the positive charged particles 128A-N to the transparent substrate 111. The applied control voltage $V_2$ decreases the effective birefringence Δn of the variable electrokinetic optic 105 compared to the high effective birefringence Δn of the neutral orientation state shown in FIG. 1. Although a direct current (DC) squarewave is utilized in FIG. 2, it should be understood that other waveforms can be used.

In the example of FIG. 2, the transparent planar surface layer 240 of positive charged particles 128A-N has a negligible change of refractive index compared to the carrier fluid 126. Positive charged particles 128A-N tend to evenly distribute to form the planar surface layer 240. Transparent planar surface layer 240 is an apparent nano/micro film and the thickness is dependent on the size of the positive charged particles 128A-N. Positive charged particles 128A-N are on the flat surface of the transparent substrate electrode 113 to create an effectively flat film on a macroscopic scale, which does not affect the input light rays 116A-N, and thus creates the tightest beam angle with the least spread. Because the positive charged particles 128A-N are small and packed in along the surface of the transparent substrate electrode 113 as the transparent planar surface layer 240, the input light rays 116A-N will enter the transparent planar surface layer 240 and pass through without spreading/scattering. The effective refractive index ($n_{eff}$) of the electrokinetic fluid 123 is thus simplified to the formula:

$$n_{eff} \approx (y_1 n_1)/(y_1)$$

This is an approximation based on the Arago-Biot Volume Ratio Approximation. From this, we know the effective refractive index $n_{eff}=n_1=1.51$.

Therefore, the effective birefringence Δn of the variable electrokinetic optic 105 is simplified to:

$$\Delta n = n_{eff} - n_1$$

Thus, the effective birefringence Δn=0 meaning the electrokinetic fluid 123 essentially becomes a uniform medium with a refractive index matching the other components of the variable electrokinetic optic 105 (e.g., transparent substrate 111, transparent substrate electrode 113, diffuser 115, diffuser electrode 125).

As shown in FIG. 2, the positive charged particles 128A-N are attracted to the transparent substrate 111 to form a transparent planar surface layer 240 on and parallel to the transparent substrate 111. Hence, the positive charged particles 128A-N are dispersed heterogeneously in the carrier fluid 126 as the transparent planar surface layer 240. Due to the low effective birefringence (Δn=0), the output light rays 131A-N for illumination lighting from the diffuser 115 are substantially unchanged relative to the input light rays 116A-N to substantially maintain the input beam angle as the output beam angle.

Figure 3:
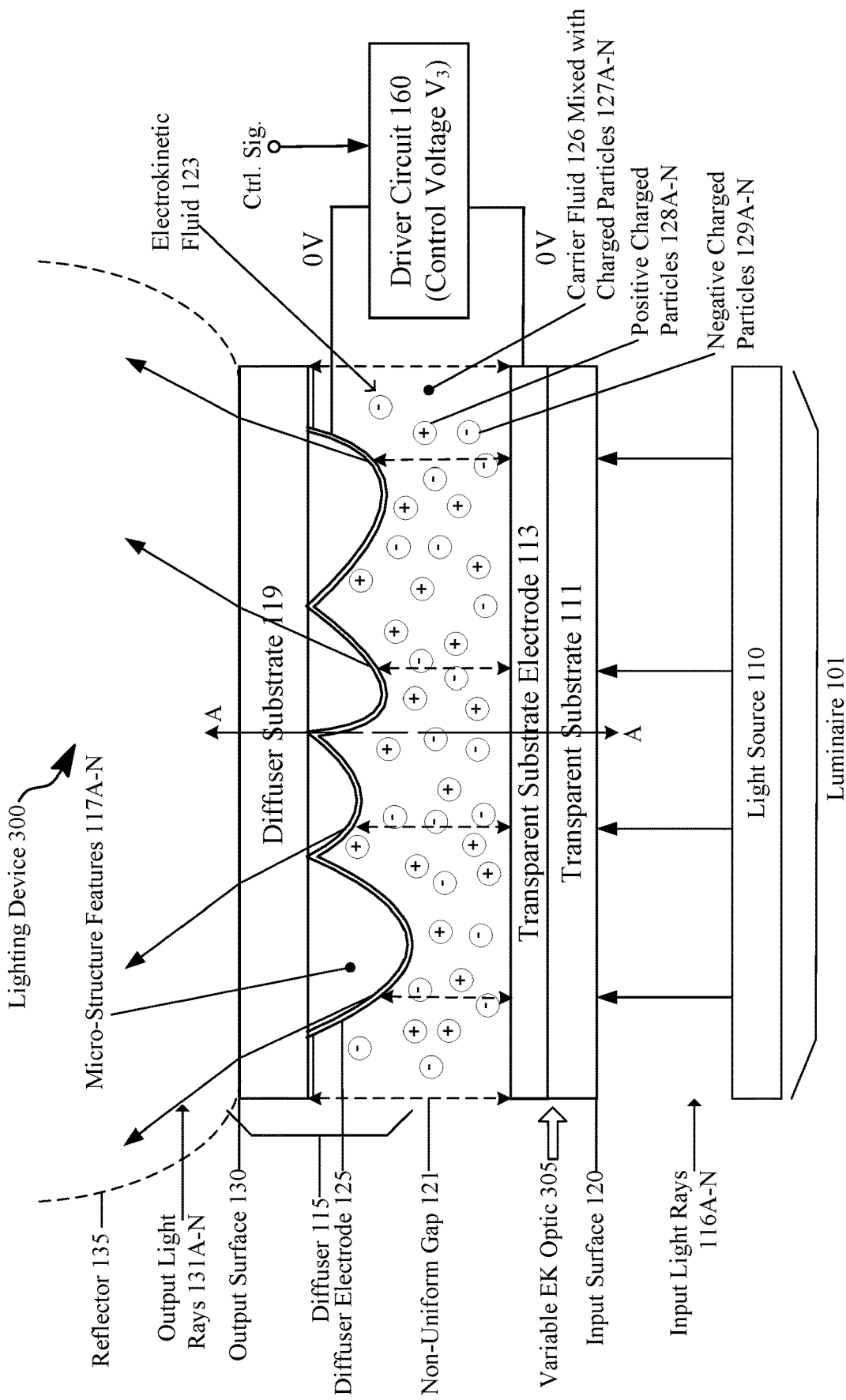
FIG. 3 is a cross-sectional view of a simplified stack for another lighting device, with positive and negative charged particles dispersed in the carrier fluid in a high effective birefringence orientation state to create a high effective birefringence of the variable electrokinetic optic.

FIG. 3 is a cross-sectional view of a simplified stack for another lighting device 300. As shown, the charged particles 127A-N of the variable electrokinetic optic 305 include positive charged particles 128A-N and negative charged particles 129A-N. In a manner like FIG. 1, the positive charged particles 128A-N and negative charged particles 129A-N are dispersed in the carrier fluid 126 in the high effective birefringence orientation state to create the high effective birefringence of the variable electrokinetic optic 305.

Each of the positive charged particles 128A-N have a substantially identical first refractive index, which is higher than a second refractive index of the carrier fluid 126. Each of the negative charged particles 129A-N have a substantially identical third refractive index, which is higher than the second refractive index of the carrier fluid 126. The first refractive index and the second refractive index are different relative to each other. In a manner akin to FIG. 1, driver circuit 160 selectively controls the applied control voltage $V_3$ at a neutral voltage to increase the effective birefringence of the variable electrokinetic optic 305. The applied control voltage $V_3$ is set to the neutral voltage and thus maintains the positive charged particles 128A-N and the negative charged particles 129A-N in a neutral orientation state or attains the neutral orientation state, such that none of the positive charged particles 128A-N and the negative charged particles 129A-N are attracted to the transparent substrate electrode 113 and the diffuser electrode 125.

The depicted positive charged particles 128A-N and negative charged particles 129A-N of FIG. 3, are dispersed in the carrier fluid 126 in the high effective birefringence orientation state to create a high effective birefringence of the variable electrokinetic optic 305. Output light rays 131A-N for illumination lighting from the diffuser 115 are highly diverged relative to the input light rays 116A-N to increase the output beam angle relative to the input beam angle.

Although the applied control voltage is set to the neutral voltage at 0 Volts ($V_3$) in the example of FIG. 3, the neutral voltage may be set to other voltage levels below a threshold voltage ($V_t$). The neutral voltage orients the positive charged particles 128A-N and the negative charged particles 129A-N in the carrier fluid 126 in the high effective birefringence orientation state, which is a low energy orientation. In this low energy high effective birefringence orientation state, the positive charged particles 128A-N and the negative charged particles 129A-N are dispersed homogeneously throughout the carrier fluid 126.

Like FIGS. 1-2, the effective birefringence Δn of the variable electrokinetic optic 305 is a mixture of the charged particles 127A-N, the carrier fluid 126, transparent substrate 111, transparent substrate electrode 113, diffuser 115, and diffuser electrode 125. Similar to FIG. 1, the neutral orientation state is shown in which the charged particles 127A-N are evenly distributed in the carrier fluid 126. However, this time charged particles 127A-N also include negative charged particles 129A-N, which means there are three different component refractive indices to consider in the electrokinetic fluid 123: positive charged negative particles 128A-N, negative charged particles 129A-N, and carrier fluid 126. The positive charge(particles 128A-N have a refractive index of 2.5 ($n_1$=2.5). The negative charged particles 128-N have a refractive index of 2.0 ($n_2$=2.0). In the example of FIG. 3, the refractive index of the transparent substrate 111 is 1.5 ($n_s$). The transparent electrode 113, diffuser 115, diffuser electrode 125, and the carrier fluid 126 are index matched with the transparent substrate 111 at 1.51 ($n_3$=$n_s$=1.51). The effective refractive index ($n_{eff}$) of the electrokinetic fluid 123 is specified by the formula:

$$n_{eff} \approx (y_1 n_1 + y_2 n_2 + y_3 n_3)/(y_1 + y_2 + y_3)$$

This is an approximation based on the Arago-Biot Volume Ratio Approximation. Where $y_1$, $y_2$ and $y_3$ are volume ratio of the positive charged particles 128A-N, negative charged particles 129A-N, and the carrier fluid 126 in the electrokinetic fluid 123.

Again, birefringence is quantified as the maximum difference between refractive indices exhibited by a material. Therefore the effective birefringence Δn of the variable electrokinetic optic 105 is specified by:

$$\Delta n = n_{eff} - n_1$$

In a first example, the volume ratio or percent of the positive charged particles 128A-N, negative charged particles 129A-N, and the carrier fluid 126 in the electrokinetic fluid 123 to each other is a 1:1:1 ratio. Hence there is 33% volume percent of positive charged particles 128A-N, 33% volume percent of negative charged particles 129A-N, and 33% volume percent carrier fluid 126. Thus, $n_{eff}$ is 2.0. Then Δn=2.0–1.5. Hence, the effective birefringence Δn is 0.5.

In a second example, the volume ratio or percent of the positive charged particles 128A-N, negative charged particles 129A-N, and the carrier fluid 126 in the electrokinetic fluid 123 to each other is a 1:1:2 ratio. Hence, there are 25% volume percent of positive charged particles 128A-N, 25% volume percent of negative charged particles 129A-N, and 50% volume percent carrier fluid 126. Thus, $n_{eff}$ is 1.875. Then Δn=1.875–1.5. Hence, the effective birefringence Δn is 0.375. The two above examples are just a couple of implementations of volume ratios or percentages of the charged particles 127A-N to the carrier fluid 126 in the electrokinetic fluid 123. Other volume ratios or percentages of charged particles 127A-N, including positive charged particles 128A-N and negative charged particles 129A-N, to carrier fluid 126 are possible depending on the implementation, such as 1:1:3, 1:1:4, 1:2:5, etc.

Figure 4:
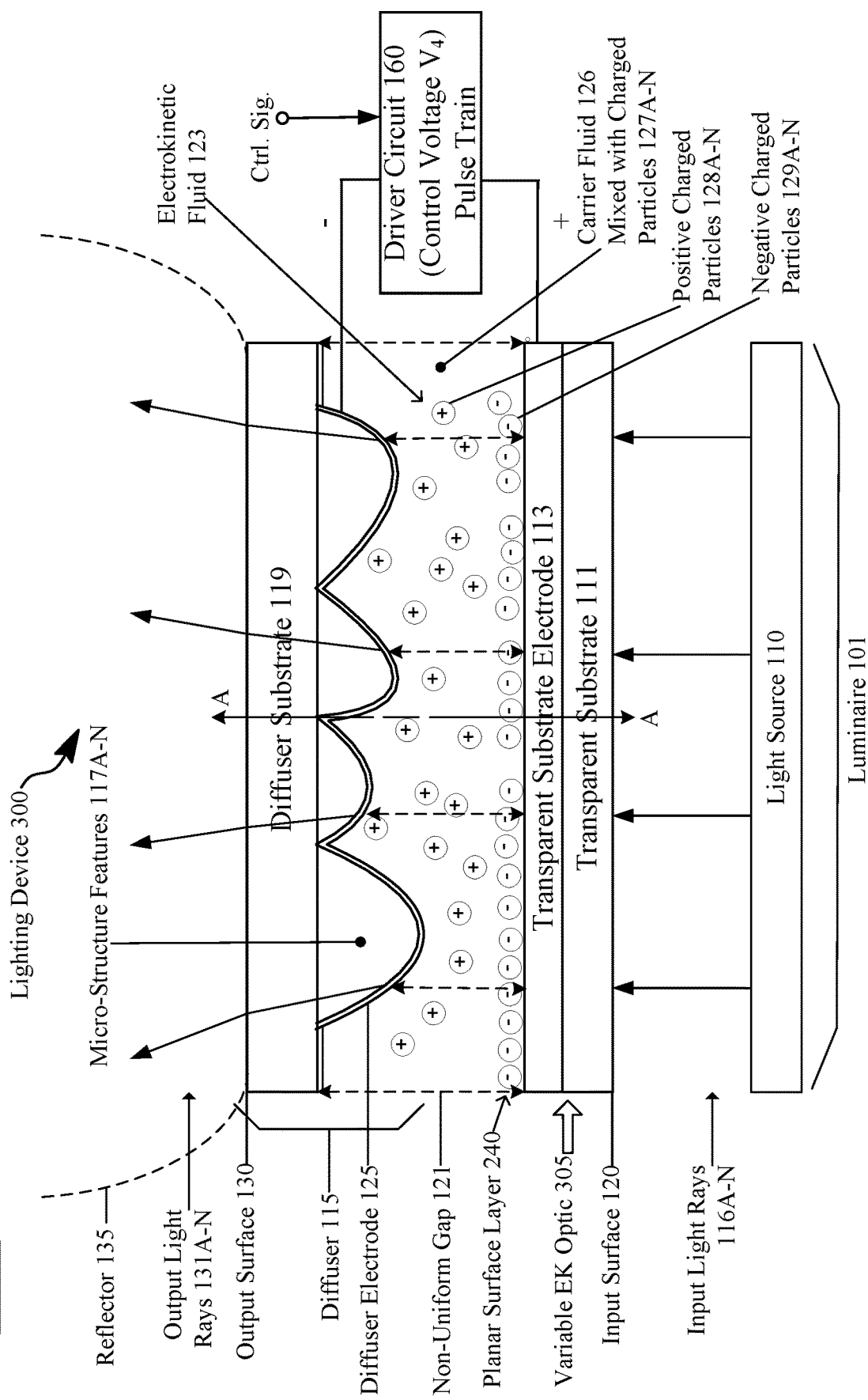
FIG. 4 is another cross-sectional view of the lighting device of FIG. 3, but with the positive and negative charged particles in an intermediate effective birefringence orientation state to create an intermediate effective birefringence of the variable electrokinetic optic.

FIG. 4 is another cross-sectional view of the lighting device 300 of FIG. 3, but with the charged particles 127A-N in an intermediate effective birefringence or state to create an intermediate effective birefringence of the variable electrokinetic optic 305. The charged particles 127A-N of the variable electrokinetic optic 305 include positive charged particles 128A-1 and negative charged particles 129A-N with refractive indices higher than the carrier fluid 126. Positive charged particles 128A-N and negative charged particles 129A-N are dispersed in the carrier fluid 126 in the intermediate effective birefringence orientation state to create the intermediate effective birefringence of the variable electrokinetic optic 305.

Like FIG. 3, the effective birefringence Δn of the variable electrokinetic optic 305 is a mixture of the positive charged particles 128A-N, negative charged particles 129A-N, the carrier fluid 126, transparent substrate 111, transparent substrate electrode 113, diffuser 115, and diffuser electrode 125. Positive charged particles 128A-N have a refractive index of 2.5 ($n_1$=1.51). Negative charged particles 128A-N have a refractive index of 2.0 ($n_2$=2.0). The refractive index of the transparent substrate 111 is 1.5 ($n_s$). The transparent electrode 113, diffuser 115, diffuser electrode 125, and the carrier fluid 126 are index matched with the transparent substrate at 1.51 ($n_3$=$n_2$=1.51).

However, in FIG. 4 the negative charged particles 129A-N have no effect and thus $n_2$ and $y_1$ are negligible. Thus, in FIG. 4, the effective refractive index ($n_{eff}$) of the electrokinetic fluid 123 is simplified and becomes similar to the case of FIG. 1:

$$n_{eff} \approx (y_1 n_1 + y_3 n_3)/(y_1 + y_3)$$

This is an approximation based on the Arago-Biot Volume Ratio Approximation. By adjusting the applied control voltage $V_4$, the negative charged particles 129A-N can be dispersed homogeneously throughout the carrier fluid 125 and the positive charged particles 128A-N can be pulled to the bottom as the transparent planar surface layer 240, giving yet another orientation state of the variable electrokinetic optic 305 and thus another different intermediate effective birefringence level.

The effective birefringence Δn of the variable electrokinetic optic 105 is still specified by:

$$\Delta n = n_{eff} - n_1$$

Driver circuit 160 selectively controls the applied control voltage $V_4$ by applying a pulse train (on/off) that includes a pulsing voltage with a positive polarity to the transparent substrate electrode 113 and a negative polarity to the diffuser electrode 125. The pulse train is based on the charge and mobility of the charged particles 127A-N and the pulsing voltage and duration (e.g., time span of each pulse) is tuned accordingly. The resulting electric field from the applied control voltage $V_4$ attracts the negative charged particles 129A-N to the transparent substrate 111. At the same time, the electric field from the applied control voltage $V_4$ attracts the positive charged particles 128A-N to the diffuser 115. The applied control voltage $V_4$ decreases the effective birefringence of the variable electrokinetic optic 305 compared to the high effective birefringence of the neutral orientation state shown in FIG. 3.

The negative charged particles 129A-N are attracted to the transparent substrate 111 to form a transparent planar surface layer 240 parallel to and on the transparent substrate 111. Positive charged particles 128A-N have reduced mobility relative to the positive charged particles 128A-N. Mobility means how fast the chanted particles 127A-N move in response to a waveform (e.g., the applied control voltage $V_4$). Thus, positive charged particles 128A-N are spread more uniformly in the carrier fluid 126 than the negative charged particles 129A-N that appear as a flat layer. Because of the reduced mobility of the positive charged particles 128A-N there is not enough time for the positive charged particles 128A-N to attract to the diffuser 115, thus a transparent planar surface layer is not formed on the diffuser 115. Moreover, if the pulse train was tuned differently (e.g., reverse polarity), there would still not be enough time for the positive charged particles 128A-N to attract to the transparent substrate electrode 113 because of this reduced mobility.

As shown, the output light rays 131A-N for illumination lighting from the diffuser 115 are intermediately diverged relative to the input light rays 116A-N to increase the output beam angle relative to the input beam angle. Due to the intermediate effective birefringence, the output beam angle of the output light rays 131A-N is not as wide as drat of FIG. 3, but is still wider than the input beam angle of the input light rays 116A-N. The intermediate effective birefringence of the variable electrokinetic optic 305 provides in between maximum and minimum light beam spreading.

Figure 5:
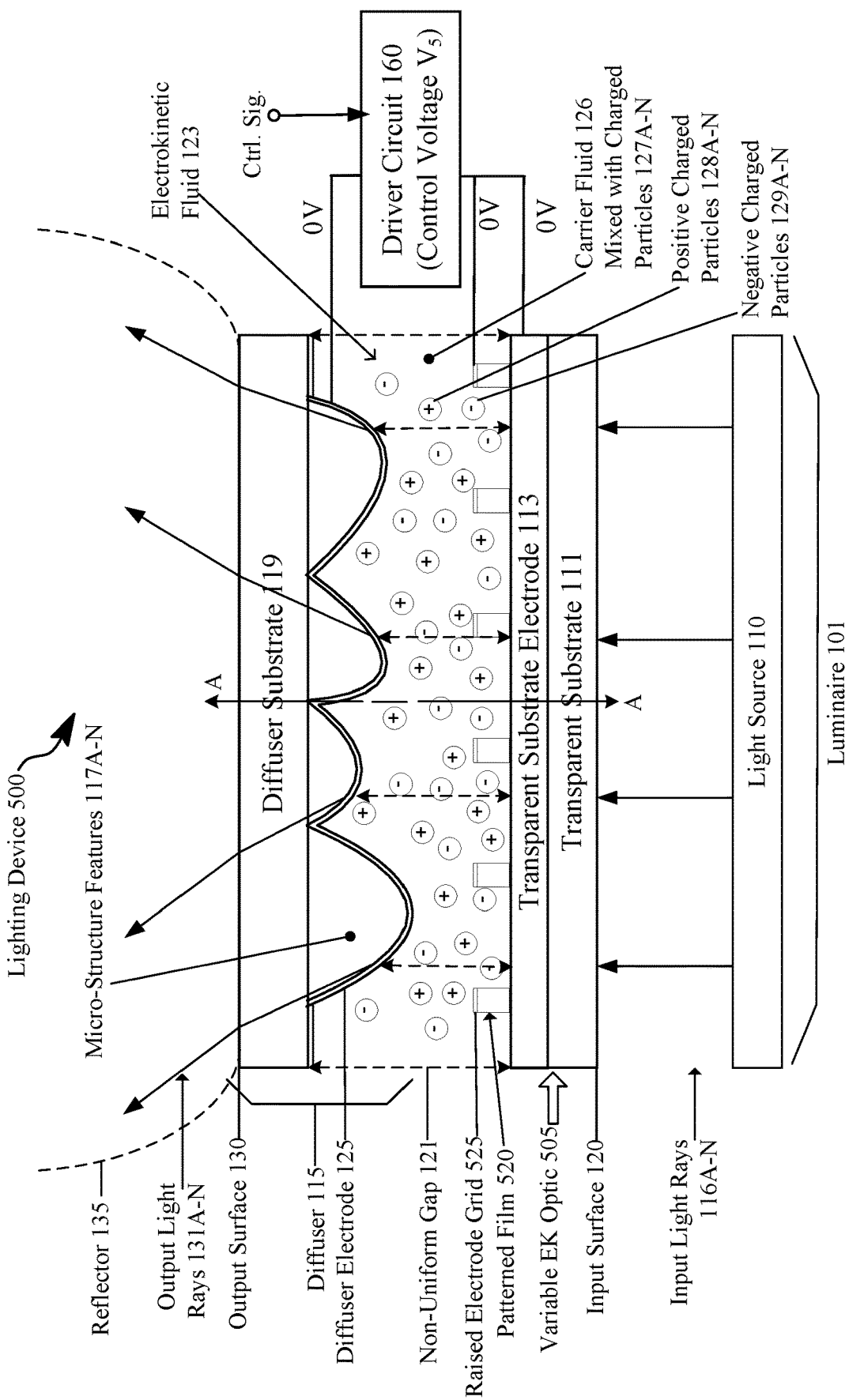
FIG. 5 is a cross-sectional view of a simplified stack for another lighting device that has an additional third electrode, with positive and negative charged particles dispersed in the electrokinetic fluid in a high effective birefringence orientation state to create a high effective birefringence of the variable electrokinetic optic.

FIG. 5 is a cross-sectional view of a simplified stack for another lighting device 500 that has a variable electrokinetic optic 505 with an additional third electrode, shown as raised electrode grid 525. As explained in further detail in FIGS. 9-12 below, the raised grid electrode 525 appears like post structures in the cross-sectional view, but is actually a single patterned contiguous electrically conductive film. As shown, the charged particles 127A-N of the variable electrokinetic optic 505 include positive charged particles 128A-N and negative Charged particles 129A-N dispersed to create a high effective birefringence of the variable electrokinetic optic 505. Like FIG. 3, assume the positive charged particles 128A-N have a refractive index of 2.5 ($n_1$=2.5). The negative charged particles 128A-N have a refractive index of 2.0 (n=2.0). The refractive index of the transparent substrate 111 is 1.5 ($n_s$). The transparent electrode 113, diffuser 115, diffuser electrode 125, and the carrier fluid 126 are index matched with the transparent substrate at 1.51 ($n_3=n_s$=1.51).

Figure 10:
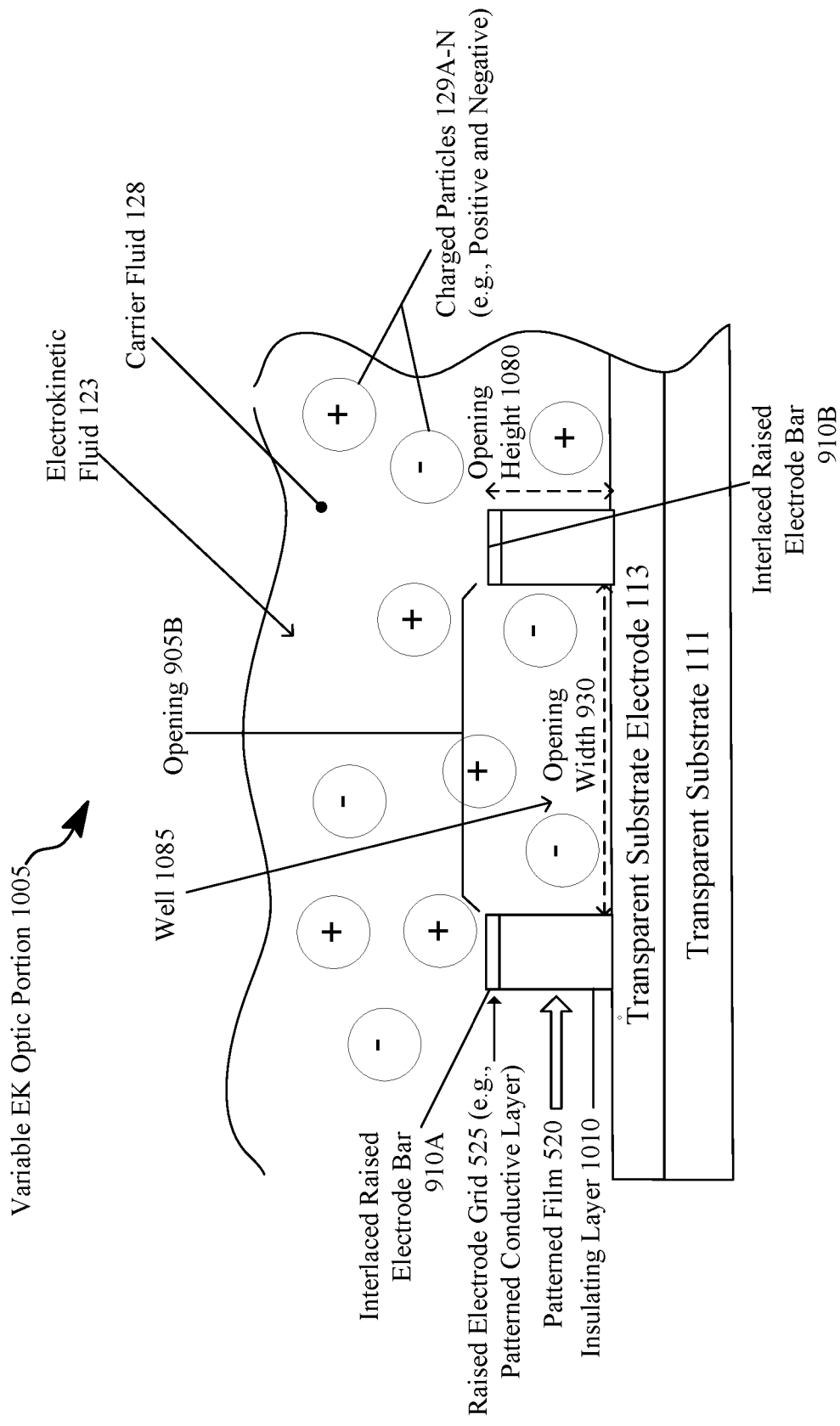
FIG. 10 is an enlarged view of a section of the patterned film, corresponding to the dashed oval A-A in FIG. 9, coupled to the transparent substrate electrode and other components of the variable electrokinetic optic of the lighting device of FIGS. 5-8.

Transparent substrate 111 includes a patterned film 520 that includes a raised grid electrode 525 on top of an insulating layer (see reference numeral 1010 in FIG. 10). Insulating layer 1010 electrically separates the raised grid electrode 525 from the transparent substrate electrode 113. Patterned film 520 includes openings (see reference numeral 905B in FIG. 10) formed as holes opening up the patterned film 520 to the transparent substrate electrode 113 below. Each of the openings forms a respective well (see reference numeral 1085 in FIG. 10) that includes the electrokinetic fluid 123 in contact with the transparent substrate electrode 113 on a bottom of the respective well (see reference numeral 1085 in FIG. 10).

Driver circuit 160 selectively controls the applied control voltage $V_5$ at a neutral voltage to increase the effective birefringence of the variable electrokinetic optic 505. The applied control voltage $V_5$ is set to the neutral voltage and thus does not attract the positive charged particles 128A-N and the negative charged particles 129A-N to any of the transparent substrate electrode 113, the raised grid electrode 525, and the diffuser electrode 125.

Charged particles 127A-N, and in particular the depicted positive charged particles 128A-N and negative charged particles 129A-N, are dispersed in the carrier fluid 126 in the high effective birefringence orientation state to create a high effective birefringence of the variable electrokinetic optic 505. Due to the high effective birefringence, output light rays 131A-N for illumination lighting from the diffuser 115 are highly diverged relative to the input light rays 116A-N to increase the output beam angle relative to the input beam angle. Although the applied control voltage $V_5$ is set to the neutral voltage at 0 Volts (V) in the example of FIG. 5, the neutral voltage may be set to other voltage levels below a threshold voltage ($V_t$). The neutral voltage neutrally orients the positive charged particles 128A-N and the negative charged particles 129A-N in the carrier fluid 126 in the high effective birefringence orientation state, which is a low energy orientation. In this low energy high effective birefringence orientation state, the positive charged particles 128A-N are dispersed homogeneously throughout the carrier fluid 126.

Figure 6:
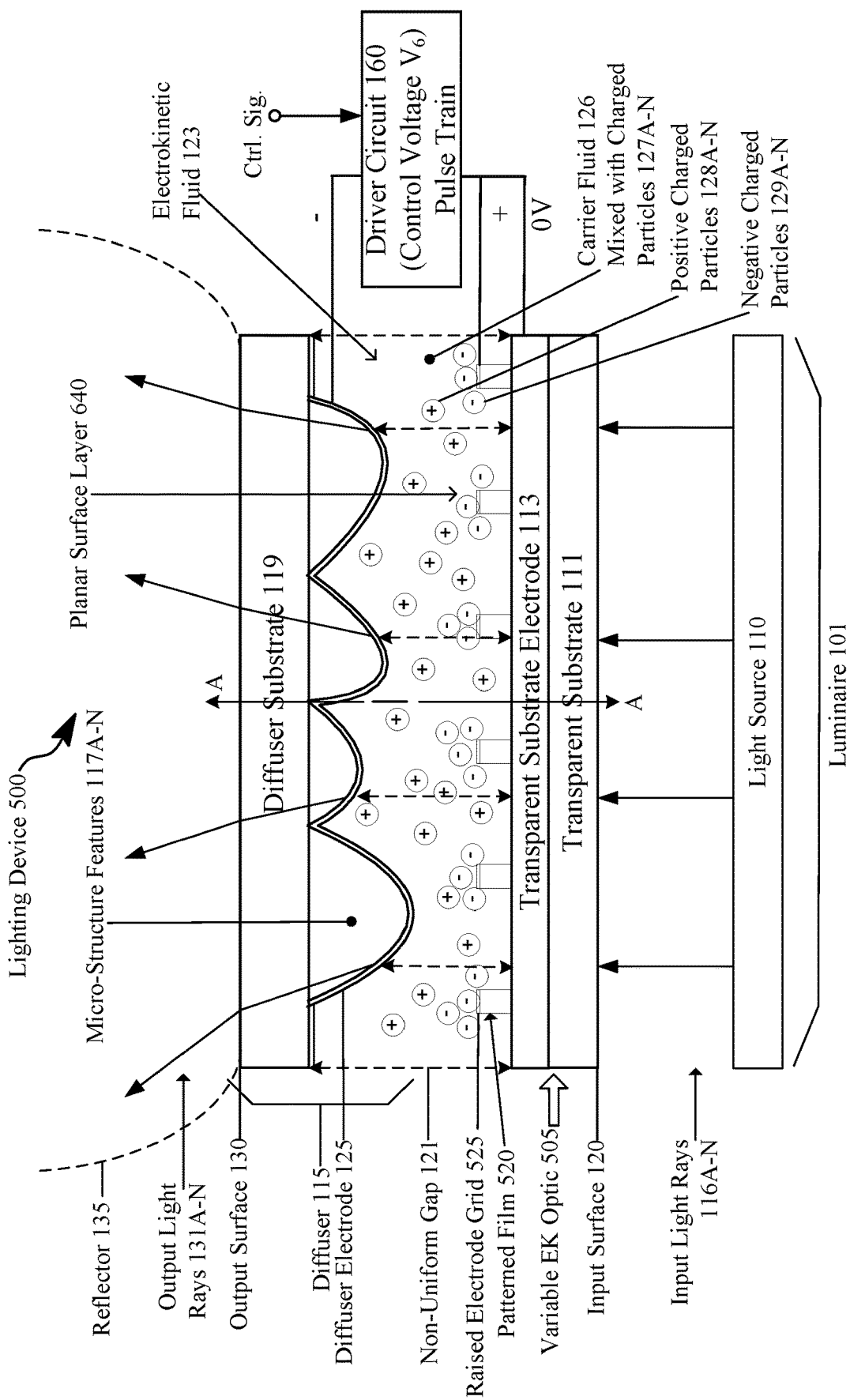
FIG. 6 is another cross-sectional view of the lighting device of FIG. 5, but with the positive and negative charged particles in an upper intermediate effective birefringence orientation state to create an upper intermediate effective birefringence of the variable electrokinetic optic.

FIG. 6 is another cross-sectional view of the lighting device 500 of FIG. 5. As shown, the charged particles 127A-N of the variable electrokinetic optic 505 include positive charged particles 128A-N and negative charged particles 129A-N. The positive charged particles 128A-N and the negative charged particles 129A-N are dispersed in an upper intermediate effective birefringence orientation state to create an upper intermediate effective birefringence of the variable electrokinetic optic 505.

Driver circuit 160 selectively controls the applied control voltage $V_6$ by applying a pulse train (on/off) that includes a pulsing voltage with a positive polarity to the raised grid electrode 525, a negative polarity to the diffuser electrode 125, and a neutral voltage (e.g., 0 Volts) to the transparent substrate electrode 113. The electric field from the applied control voltage $V_6$ with the positive polarity on the raised grid electrode 525 attracts the negative charged particles 129A-N to the raised grid electrode 525. The applied control voltage $V_6$ decreases the effective birefringence of the variable electrokinetic optic 505 compared to the high effective birefringence of the neutral orientation state shown in FIG. 5.

The electric field from the applied control voltage $V_6$ with the negative polarity on the diffuser electrode 125 attracts the positive charged particles 128A-N to the diffuser electrode 125. The applied control voltage $V_6$ set to the neutral voltage on the transparent substrate electrode 113 maintains the positive charged particles 128A-N and negative charged particles 129A-N in a semi-neutral orientation state or attains the semi-neutral orientation state. In the semi-neutral orientation state, none of the positive charged particles 128A-N and the negative charged particles 129A-N are attracted to the transparent substrate electrode 113.

The negative charged particles 129A-N form a somewhat negligible transparent planar surface layer 640 on the raised grid electrode 525. Thus, an upper intermediate effective birefringence is achieved because the negative charged particles 128A-N still factor into the effective birefringence since a completely flat film is not formed by the transparent planar surface layer 640. As shown, the output light rays 131A-N for illumination lighting from the diffuser 115 are upper intermediately diverged relative to the input light rays 116A-N to increase the output beam angle relative to the input beam angle. Due to the upper intermediate effective birefringence, the output beam angle of the output light rays 131A-N is not as wide as that of FIG. 5, but is still wider than the input beam angle of the input light rays 116A-N.

Positive charged particles 128A-N have reduced mobility compared to the negative charged particles 129A-N. Thus, the negative charged particles 129A-N move faster to reorient themselves more quickly in response to the applied control voltage $V_7$ compared to the positive charged particles 128A-N. Alternatively, the mobility can be reversed where the positive charged particles 128A-N have increased mobility compared to the negative charged particles 129A-N and polarities can be reversed of the applied control voltage $V_6$ to create another effective birefringence level and thus output beam angle.

Figure 7:
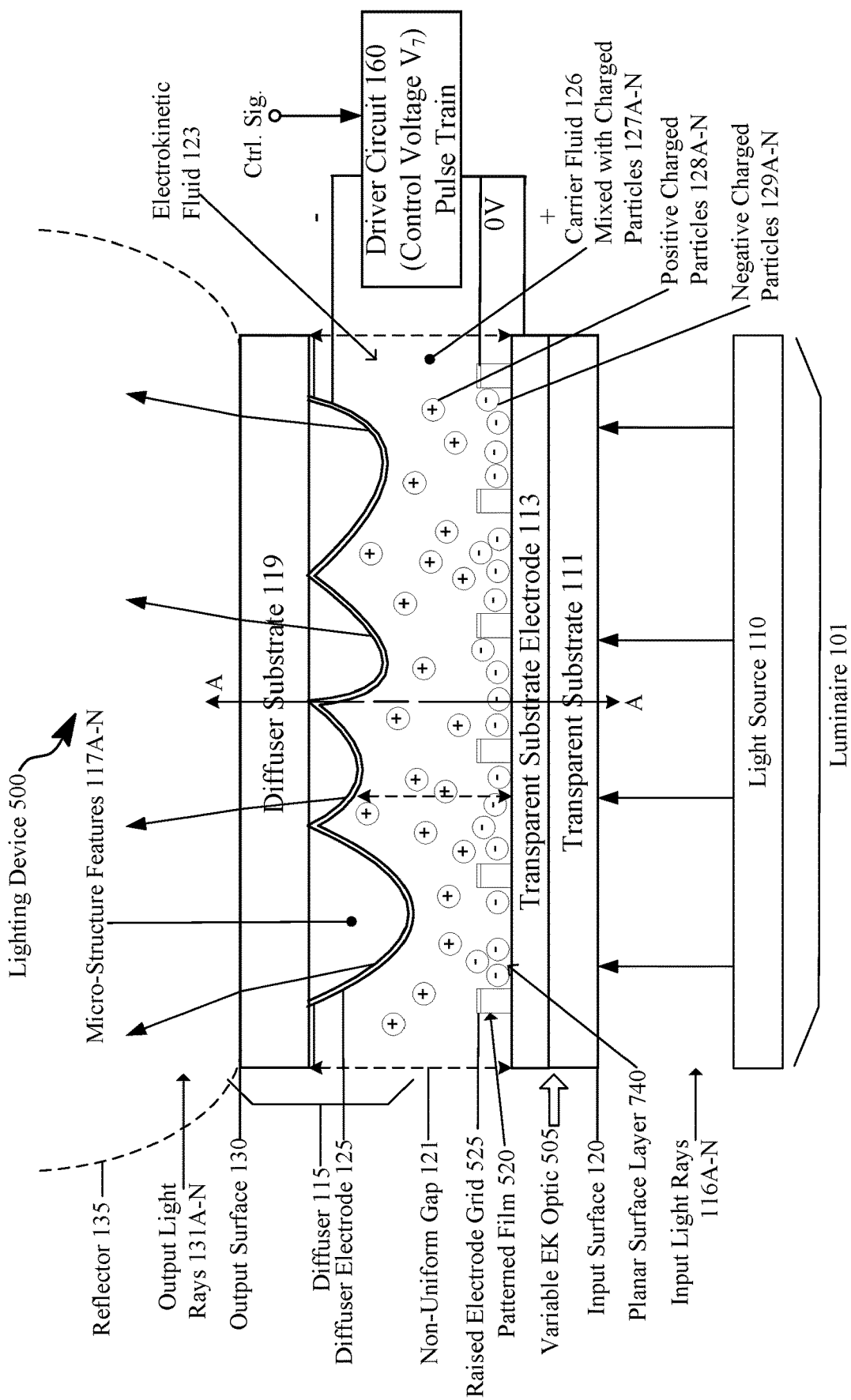
FIG. 7 is another cross-sectional view of the lighting device of FIG. 5, but with the positive and negative charged particles in a lower intermediate effective birefringence orientation state to create a lower intermediate effective birefringence of the variable electrokinetic optic.

FIG. 7 is another cross-sectional view of the lighting device 500 of FIG. 5. The positive charged particles 128A-N and the negative charged particles 129A-N are dispersed in a lower intermediate effective birefringence orientation state to create a lower intermediate effective birefringence of the variable electrokinetic optic 505. Different electrodes 113, 115, and 525 are actuated by the driver circuit 160 compared to FIG. 6.

Driver circuit 160 selectively controls the applied control voltage $V_7$ by applying a pulse train (on/off) that includes a pulsing voltage with a positive polarity to the transparent substrate electrode 113, a negative polarity to the diffuser electrode 125, and a neutral voltage (e.g., 0 Volts) to the raised grid electrode 525. The applied control voltage $V_7$ decreases the effective birefringence of the variable electrokinetic optic 505 compared to the high effective birefringence of the neutral orientation state shown in FIG. 5 and the upper intermediate effective birefringence of the upper intermediate effective birefringence orientation state of FIG. 6. The electric field from the applied control voltage $V_7$ with the positive polarity on the transparent substrate electrode 113 attracts the negative charged particles 129A-N to the transparent substrate electrode 113.

The electric field from the applied control voltage $V_7$ with the negative polarity on the diffuser electrode 125 attracts the positive charged particles 128A-N to the diffuser electrode 125. The applied control voltage $V_7$ set to the neutral voltage on the raised grid electrode 525 maintains the positive charged particles 128A-N and negative charged particles 129A-N in a semi-neutral orientation state or attains the semi-neutral orientation state. In the semi-neutral orientation state, none of the positive charged particles 128A-N and the negative charged particles 129A-N are attracted to the raised grid electrode 525.

The negative charged particles 129A-N are attracted to the transparent substrate electrode 113 to form a transparent planar surface layer 740 on the bottom of the respective well (see reference numeral 1085 in FIG. 10). Hence, the negative charged particles 129A-N are dispersed heterogeneously in the carrier fluid 126 as the transparent planar surface layer 740. Positive charged particles 128A-N have reduced mobility relative to the positive charged particles 128A-N. Thus, positive charged particles 128A-N are spread more uniformly in the carrier fluid 126 than the negative charged particles 129A-N. Because of the reduced mobility of the positive charged particles 128A-N and large size of the non-uniform gap 121 compared to the opening height 1080, a transparent planar surface layer is not formed on the diffuser 115.

The negative charged particles 129A-N form a mostly negligible transparent planar surface layer 740 on the transparent substrate electrode 113. Thus, a lower intermediate effective birefringence is achieved because the negative charged particles 129A-N less strongly influence the effective birefringence. As shown, the output light rays 131A-N for illumination lighting from the diffuser 115 are lower intermediately diverged relative to the input light rays 116A-N to increase the output beam angle relative to the input beam angle. Due to the lower intermediate effective birefringence, the output beam angle of the output light rays 131A-N is not as wide as that of FIGS. 5-6, but is still slightly wider than the input beam angle of the input light rays 116A-N.

Figure 8:
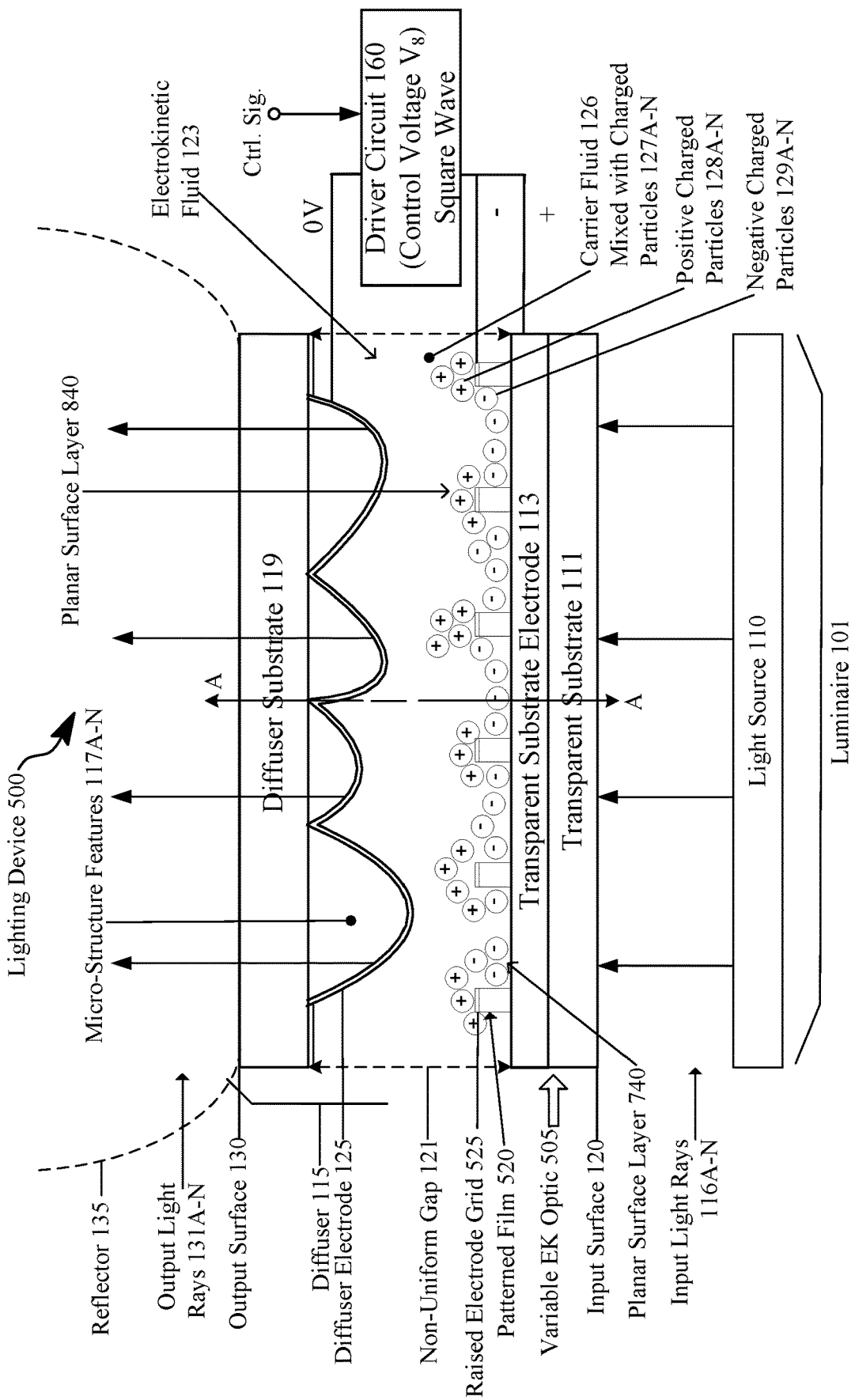
FIG. 8 is another cross-sectional view of the lighting device of FIG. 5, but with the positive and negative charged particles in a low effective birefringence orientation state to create a low effective birefringence of the variable electrokinetic optic.

FIG. 8 is another cross-sectional view of the lighting device 500 of FIG. 5. The positive charged particles 128A-N and the negative charged particles 129A-N are dispersed in a low effective birefringence orientation state to create a low effective birefringence of the variable electrokinetic optic 505. However, this time different electrodes 113, 115, and 525 are actuated by the driver circuit 160 compared to FIGS. 6-7.

Driver circuit 160 selectively controls the applied control voltage $V_8$ by applying a square wave voltage with a positive polarity to the transparent substrate electrode 113, a negative polarity to the raised grid electrode 525, and a neutral voltage (e.g., 0 Volts) to the diffuser electrode 125. The applied control voltage $V_8$ decreases the effective birefringence of the variable electrokinetic optic 505 compared to the high effective birefringence of the neutral orientation state shown in FIG. 5, the upper intermediate effective birefringence of the upper intermediate effective birefringence orientation state of FIG. 6, and the lower intermediate effective birefringence of the upper intermediate effective birefringence orientation state of FIG. 7. The electric field from the applied control voltage $V_8$ with the positive polarity on the transparent substrate electrode 113 attracts the negative charged particles 129A-N to the transparent substrate electrode 113.

The electric field from the applied control voltage $V_8$ with the negative polarity on the raised grid electrode 525 attracts the positive charged particles 128A-N to the raised grid electrode 525. The applied control voltage $V_8$ set to the neutral voltage on the diffuser electrode 125 maintains the positive charged particles 128A-N and negative charged particles 129A-N in a semi-neutral orientation state or attains the semi-neutral orientation state. In the semi-neutral orientation state, none of the positive charged particles 128A-N and the negative charged particles 129A-N are attracted to the diffuser electrode 125.

Like FIG. 7, the negative charged particles 129A-N are attracted to the transparent substrate electrode 113 to form a transparent planar surface layer 740 on the bottom of the respective well (see reference numeral 1085 in FIG. 10). As further shown, the positive charged particles 128A-N are attracted to the raised grid electrode 525 to form a transparent planar surface layer 840 on the raised grid electrode 525. Hence, the positive charged particles 128A-N and the negative charged particles 129A-N are dispersed heterogeneously in the carrier fluid 126 as the transparent planar surface layers 740, 840.

Like FIG. 2, because of the two transparent planar surface layers 740, 840, the effective refractive index ($n_{eff}$) of the electrokinetic fluid 123 is thus simplified to the formula:

$$n_{eff} \approx (y_1 n_1)/(y_1)$$

This is an approximation based on the Arago-Biot Volume Ratio Approximation, From this, we know the effective refractive index $n_{eff} = n_1 = 1.51$. Therefore, the effective birefringence $\Delta n$ of the variable electrokinetic optic 505 is simplified to:

$$\Delta n = n_{eff} - n_1$$

Thus, the effective birefringence $\Delta n = 0$ meaning the electrokinetic fluid 123 essentially becomes a uniform medium with a refractive index matching the other components of the variable electrokinetic Optic 505 (e.g., transparent substrate 111, transparent substrate electrode 113, diffuser 115, diffuser electrode 125). Due to the low effective birefringence (Δn=0), the output light rays 131A-N for illumination lighting from the diffuser 115 are substantially unchanged relative to the input light rays 116A-N to substantially maintain the input beam angle as the output beam angle.

Figure 9:
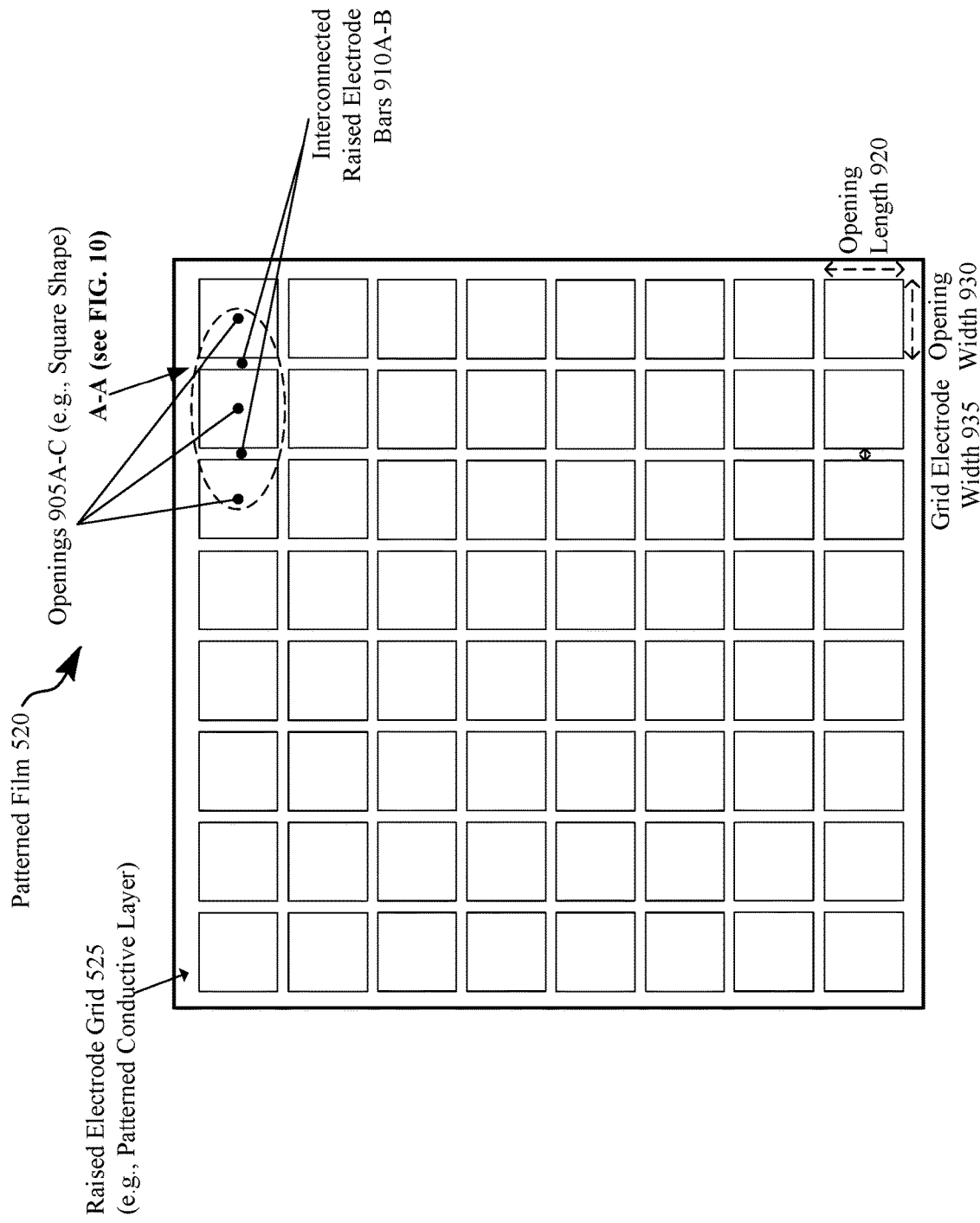
FIG. 9 is a plan view of a patterned film layout including a raised electrode grid and square openings formed fix coupling to a transparent substrate of the lighting device of FIGS. 5-8.

FIG. 9 is a plan view of a layout of the patterned film 520 for coupling to the transparent substrate 111 of the lighting device 500 of FIGS. 5-8. Patterned film 520 includes a conductive layer on top of an insulating layer (see reference numeral 1010 in FIG. 10). As shown, the patterned film 520 is patterned to form the raised electrode grid 525 which forms a grid like shape after openings 905A...N are formed in the patterned film 520. Raised grid electrode 525 appears like a checkerboard, but is a patterned contiguous conductive film of grid. limes. Multiple openings 905A...N are formed, of which a subset 905A-C are labeled and circled in the section A-A for ease or illustration. Openings 905A-N are formed as square holes in the patterned film 520 by selectively removing both the top conductive layer and the bottom insulating layer to make the patterned film 520. In the example of FIG. 9, the openings 905A-N are patterned as square holes in a matrix like arrangement, which forms interconnected raised electrode bars 910A-B of the raised electrode grid 525. Interconnected raised electrode bars 910A-B are electrically connected to form the raised electrode grid 525. Openings 905A-N may be formed with other shapes, for example, other polygon shapes, to formed different layouts of the electrode 525.

Patterned film 520 is a layered structure, which can be built up as thin layers during roll-to-roll processing on the transparent substrate 111. Roll-to-roll processing may be the most cost-effective manufacturing method in terms of volume for mass production, but other techniques can be utilized. Patterned film 520 can be fabricated utilizing molding, casting, machining, laser, micro-milling, photo patterning, photolithography, or other suitable manufacturing techniques. For example, the transparent substrate electrode 113 is deposited and coated on the transparent substrate 111. After the transparent substrate electrode 113 is coated on the transparent substrate 111, first the insulating layer 1010 (e.g., polymer, such as epoxy, polyester, polyimide, polyamide) and then a conductive layer, such as indium tin oxide (ITO) or other conductive material (e.g., transparent or non-transparent) is deposited. in one example, the insulating layer 1010 is deposited on the transparent substrate electrode 113 and then patterned. In another example, the insulating layer 1010 is pre-molded, placed on the transparent substrate electrode 113, and then bonded (e.g., adhered). The conductive layer is then deposited over the entirety of the insulating layer 1010 and selectively removed. Alternatively, the conductive layer is selectively deposited in a desired pattern of the raised electrode grid 525 on the insulating layer 1010, such that no removal of the conductive layer is needed after deposition. In a further example, the insulating layer 1010 may be pre-molded, coated with a conductive layer on a top side and then an opposing bottom side of the insulating layer 1010 bonded to the transparent substrate electrode 113. Alternatively, insulating layer 1010 may be pre-formed with the conductive layer and then bonded to the transparent substrate electrode 113. Each of the openings 905A-N have an opening length 920 and an opening width 930, which determine the area of each opening 905A-N. As further shown in FIG. 10, each of the openings 905A-N have an opening height 1080 which, along with the opening length 920 and the opening width 930, determine the overall volume of the opening that forms the opening 905A-N. Grid electrode width 935 is the space between each of the openings 905A-N and determines the width of each of the interconnected raised electrode bars 910A-B that form the raised electrode grid 525.

FIG. 10 is an enlarged view of a section of the patterned film 520, corresponding to the dashed oval A-A in FIG. 9. As shown, the patterned film 520 is coupled to the transparent substrate electrode 113 and other components of a variable electrokinetic optic portion 1005 of the overall variable electrokinetic optic 505 of the lighting device 500 of FIGS. 5-8. Variable electrokinetic optic portion 1005 includes opening 905B, which is formed between two raised electrode bars 910A-B.

Opening 905B is a hole in the patterned film 520 of both the conductive layer and the insulating layer 1010 which form the patterned film 520. Opening 905B is formed in the patterned film 520 between the interconnected raised electrode bars 910A-B of the raised electrode grid 525. Opening 905B forms a respective well 1085 that includes the electrokinetic fluid 123 in contact with the transparent substrate electrode 113 on a bottom of the respective well 1085. As shown, the opening of the opening 905B has an opening width 930 and an opening height 1080. The opening height 1085 is the depth of the opening 905B.

Variable electrokinetic optic 505 allows for the horizontal movement of charged particles 127A-N to the raised electrode grid 525. In the depicted cross-section, the raised electrode grid 525 is viewed as posts or some protruding structure from the transparent substrate electrode 113, labeled as interconnected raised electrode bars 910A-B. There may be scattering of light where the negative charged particles 129A-N collect on the raised electrode grid 525 as shown in FIG. 6, but scattering can be minimized by proper spacing of interconnected raised electrode bars 910A-B. Although not shown to scale in FIGS. 9-10, the grid electrode width 935 is preferably much smaller than the opening width 930. For example, the grid electrode width 935 is approximately 10-20 times smaller than the opening width 930. Due to the small size of negative charged particles 129A-N (or positive charged particles 128A-N if polarity is changed), even when collected on the top of the interconnected raised electrode bars 910A-B (as shown in FIG. 6) are perceived as a transparent planar surface layer 240 (flat film) macroscopically.

Different layouts of the raised grid electrode 525 can achieve the same type of movement of charged particles 127A-N as long as the raised grid electrode 525 is electrically separated from transparent substrate electrode 113 via insulating layer 1010, insulating layer 1010 may be a thin film dielectric. Opening height 1080 is variable, but is typically less than 50 microns because of the added opening height 1080 due to the structure of the diffuser 115.

Figure 11:
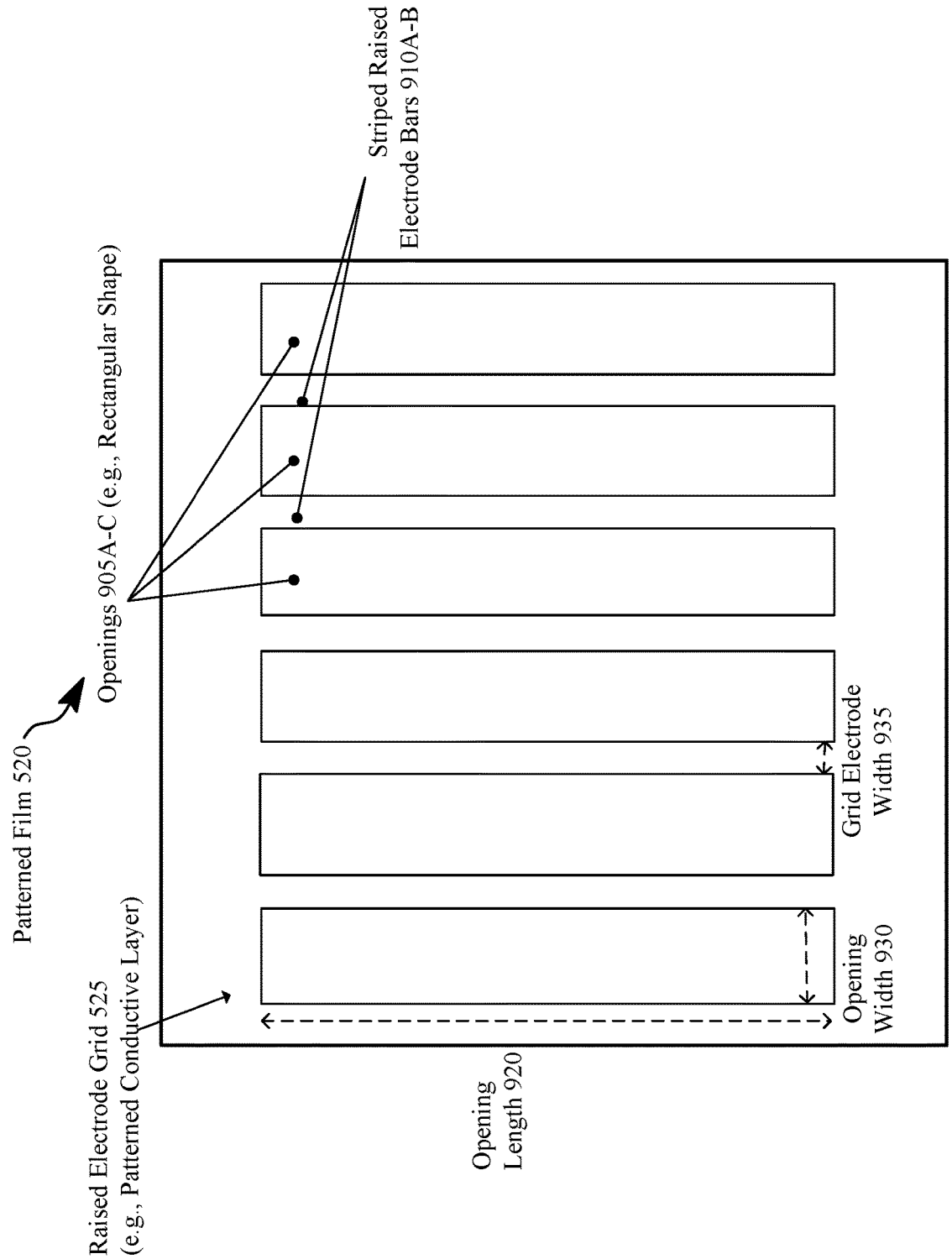
FIG. 11 is a plan view of another patterned film layout including a raised electrode grid and striped openings, for coupling to a transparent substrate of the lighting device of FIGS. 5-8.

FIG. 11 is a plan view of another layout for the patterned film 520 including a raised electrode grid 525 and long rectangular openings 905A-C. The patterned film 520 is for coupling to a transparent substrate 111 of the lighting device 500 of FIGS. 5-8. Like FIG. 9, patterned film 520 includes a conductive layer on top of an insulating layer (see reference numeral 1010 in FIG. 10). As shown, the patterned film 520 is patterned to form the raised electrode grid 525, which forms a striped shape. In FIG. 11, long rectangular shaped openings 905A-N are formed in the patterned film 520, which can be easier to fabricate than the shape patterns shown in FIGS. 9 and 12. Openings 905A-N are formed as long rectangular shaped holes in the patterned film 520, open both the top conductive layer and the bottom insulating layer 1010. Openings 905A-N form respective wells 1085 that expose the transparent substrate electrode 111 to the electrokinetic fluid 123. In the example of FIG. 11, the openings 905A-N are patterned as parallel rectangles to form striped raised electrode bars 910A-B of the raised electrode grid 525. Ends of the striped raised electrode bars 910A-B are electrically connected on one or both ends to form the raised electrode grid 525.

Figure 12:
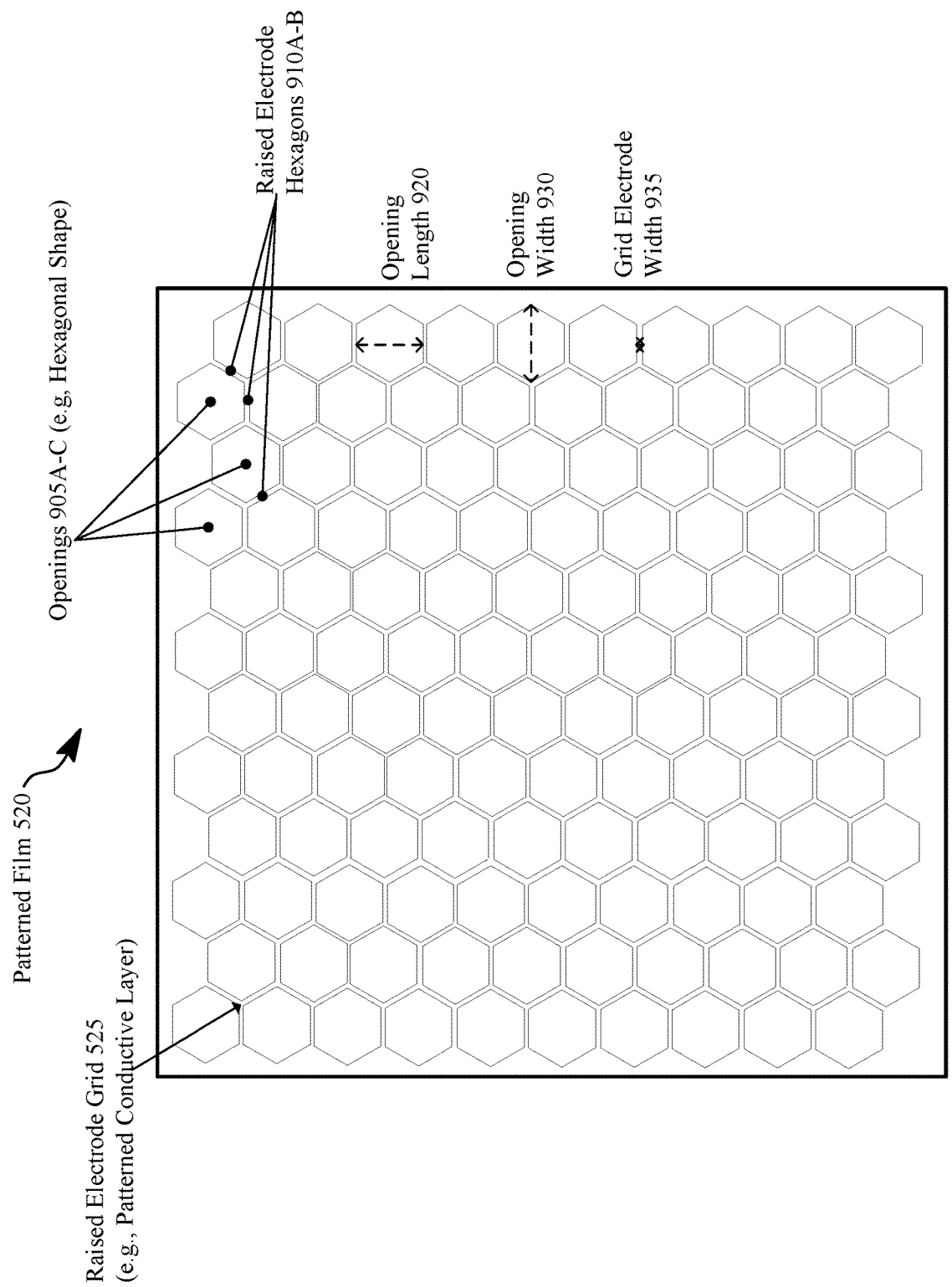
FIG. 12 is a plan view of another patterned film layout including a raised electrode grid and hexagonal openings, for coupling to a transparent substrate of the lighting device of FIGS. 5-8.

FIG. 12 is a plan view of another layout for the patterned film 520 including a raised electrode grid 525 and hexagonal openings 905A-C, which form raised electrode hexagons 910A-B with a honeycomb shape. The patterned film 520 is for coupling to a transparent substrate 111 of the lighting device 500 of FIGS. 5-8. Like FIGS. 9 and 11, patterned film 520 includes a conductive layer on top of an insulating layer (see reference numeral 1010 in FIG. 10). As shown, the patterned film 520 is patterned to form the raised electrode grid 525, which forms a hexagonal grid like shape after openings 905A-N are formed in the patterned film 520. Openings 905A-N are formed as hexagonal openings (e.g., hexagonal holes) in the patterned film 520, which cut (e.g., etch) away both the top conductive layer and the bottom insulating layer 1010. In the example of FIG. 12, the openings 905A-N are patterned as multiple hexagons in a matrix like arrangement, which form the raised electrode hexagons 910A-B of the raised electrode grid 525. Raised electrode hexagons 910A-C are electrically connected to form the raised electrode grid 525 and adjacent raised electrode hexagons 910A-C have common walls in between which are electrically connected as a film to form the raised grid electrode 525. For example, raised electrode hexagon 910A shares a common wall with raised electrode hexagon 910B and raised electrode hexagon 910B shares a common wall with raised electrode 910C. Inside of the raised electrode hexagons 910A-C are openings 905A-C, which form respective wells 1085.

Figure 13:
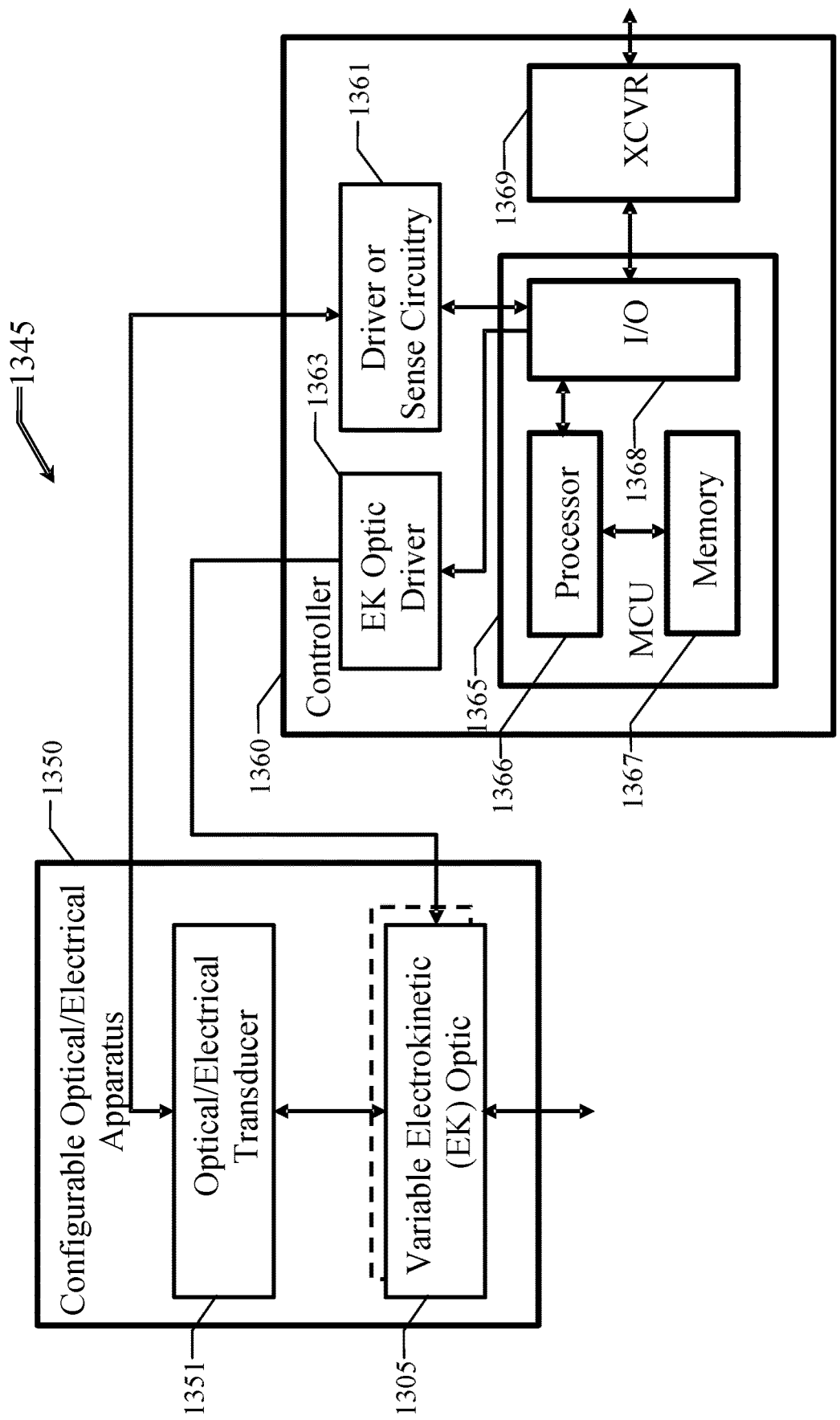
FIG. 13 is a simplified functional block diagram of a system combining a variable electrokinetic optic with an optical/electrical transducer and associated circuitry.

FIG. 13 is a simplified functional block diagram of a system 1345, which includes a configurable optical/electrical apparatus 1350 and a controller 1360. The configurable optical/electrical apparatus 1350 combines a variable electrokinetic optic 1305 using electrokinetic fluid 123 with an optical/electrical transducer 1351. The variable electrokinetic optic 1305 may be similar to any one of the earlier example optics of FIGS. 1-8. Although associated circuitry may be provided in the apparatus 1350, the example shows circuitry in the controller 1360, which may be somewhat separate from or even remote from the configurable optical/electrical apparatus 1350. An optical/electrical transducer 1351 is a device that converts between forms of optical and electrical energy, for example, from optical energy to an electrical signal or from electrical energy to an optical output. Hence, the optical/electrical transducer 1351 can be either electrical-to-optical transducers or optical-to-electrical transducers.

Examples of electrical-to-optical transducers can include various light emitters or point light sources, although the emitted light may be in the visible spectrum or in other wavelength ranges. Suitable light generation sources for use as the transducer 1351 include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used to implement the transducer 1351. For example, it should be understood that non-micro versions of the foregoing light generation sources can be used. Hence, in the previous examples, the light source 110 of FIGS. 1-8 includes one or more electrical-to-optical transducers in which electrical power is used to emit light.

Examples of optical-to-electrical transducers include various sensors or detectors, photovoltaic devices and the like to be individually activated for outputting a respective electrical signal in response to light. Optical-to-electrical transducers discussed herein are responsive to light, and the light may be visible light, ultraviolet light, infrared, near infrared or light in other portions of the optical spectrum.

When optical/electrical transducer 1351 is a light source 110, the light source 110 may use a single emitter to generate light or may combine light from some number of emitters that generate the light. A lamp or 'light bulb' is an example of a single source. An ED light engine may use a single output for a single source but typically combines light from multiple LED type emitters within the single light engine. Many types of light sources provide an illumination light output that generally appears uniform to an observer, although there may be some color or intensity striations, e.g. along an edge of a combined light output. For purposes of the present examples, however, the appearance of the light source output may not be strictly uniform across the output area or aperture of the source. For example, although the source may use individual emitter or groups of individual emitters to produce the light generated by the overall source; depending on the arrangement of the emitters and any associated mixer or diffuser, the light output may be relatively uniform across the aperture or may appear pixelated to an observer viewing the output aperture. The individual emitters or groups of emitters may be separately controllable, for example to control intensity or color characteristics of the source output. As such, the light source 110 used as an emitter type of optical/electrical transducer 1351 may or may not be pixelated for control purposes. The variable electrokinetic optic 1305 is dynamically controlled to selectively optically change or spatially (optically) modulate the light distribution output from the transducer and thus from the apparatus 1350. The variable electrokinetic optic 1305 may support controlled beam steering, controlled beam shaping, or a combination of controlled beam steering and shaping.

In another example, optical transducer 1351 is an optical-to-electrical converter, that is to say, a light sensor or detector or a photovoltaic device. The overall apparatus 1350 in such a case may be configured as a light responsive sensor, an imager, a light responsive power source, or the like. The light detector may be an array of light detectors, a photo-detector such as a photodiode, or a photovoltaic device, depending on the desired function of optical/electrical apparatus 1350. Other suitable light detectors for use as optical/electrical transducer 1351 include charge-coupled device (CCD; arrays, complementary metal-oxide-semiconductor (CMOS) arrays, photomultipliers, image intensifiers, phototransistors, photo resistors, thermal imagers, and micro-electromechanical system (MEMS) imagers. Nonetheless, virtually any detector of light may be used as the transducer 1351 in an optical-to-electrical arrangement of apparatus 1350. Suitable light detectors will be known to one of ordinary skill in the art from the description herein. The variable electrokinetic optic 1305 is dynamically controlled to selectively optically change or spatially (optically) modulate the field of view of light coming into the apparatus 1350 for delivery to transducer 1351. The variable electrokinetic optic 1305 therefore supports controlled beam shaping, with respect to light from a field of intended view for the particular optical-to-electrical application of the apparatus 1350.

While light source 1110 examples and light detector examples are described separately, it will be understood that both types of optical/electrical transducers 1351 may be present in a single optical apparatus 1350 and/or some optical transducers can serve both input and output functions (e.g. some LEDs can be multiplexed between the emitting operation and a light detection operation). Such a combined arrangement or operation, for example, may advantageously provide capabilities to reconfigure the light output distribution in accordance with a desired light detection pattern or field of view.

In an overall apparatus 1350, with an optical electrical transducer 1351, the variable electrokinetic optic 1305 optionally may have a lens on one side or the other side or have lenses on both sides, of the variable electrokinetic optic 1305, along the axis of the optical path through the variable electrokinetic optic 1305 and to or from the transducer 1351. Such a lens may help to extend the range of beam shaping angles of an apparatus 1350 that incorporates a particular design or stack structure for the variable electrokinetic optic 1305. As an alternative to using a lens, another approach to extend beam shaping range involves stacking two or more variable electrokinetic optics back to back (in some cases, with one substrate serving as a substrate of two adjacent optic stacks). FIG. 13 therefore shows an additional/optional variable electrokinetic optic (in dotted line form) associated with the variable electrokinetic optic 1305. Each such variable electrokinetic optic in a stack could be individually controlled by a voltage applied from a different control channel of the electrokinetic optic driver 1363 (or from a separate additional EK optic driver). The stacked optics may have similar structures or somewhat different structures (e.g. different diffusers and/or different electrokinetic materials).

Although not shown, additional optical processing elements may be provided in the apparatus 1350. In a luminaire for general illumination or in another type of light emission device (e.g. a flash), for example, an emitter type transducer 1351 may be coupled to the variable electrokinetic optic 1305 via a collimating optic, such as a total internal reflection (TIR) lens.

A transducer 1351, such as a light emitter or a light detector, often connects to corresponding electrical circuitry to operate the particular type of transducer, e.g. a driver circuit to supply power to an emitter or a sense circuit to process an output signal from a detector (and provide power to the detector if necessary). Hence, to operate the transducer 1351, the controller 1360 includes corresponding driver or sense circuitry 1361. The type of circuitry 1361 would depend on the type of transducer 1351.

The controller 1360 includes an electrokinetic (EK) optic driver 1363, such as driver circuit 160 of FIGS. 1-8, to selectively provide signals to the electrodes to control the orientation state of the variable electrokinetic optic 1305 (and any other such optics if included). The driver 1363, for example, may be circuitry constructed/configured to apply direct current (DC) voltages or alternating current (AC) voltages or AC with a DC offset to the electrodes of each electrokinetic optic in the apparatus 1350. A variable electrokinetic optic 1305, for example, may be driven with a DC squarewave, pulse train, however, alternating current (AC) and other waveforms can be used. The amplitudes can be as high as 200V, and as low as 10V. The voltage amplitudes used are primarily dependent on the fabrication of the electrokinetic variable light shaping optic 1305. In regards to the states when the amplitude is high, versus low, this is dependent on desired ordinary operating condition (orientation state) and which charged particles 127A-N and carrier fluid 126 are chosen. In our case, we assume that a neutral orientation state as in FIGS. 1, 3, and 5 (perpendicular to the substrate(s)) at the neutral voltage (e.g., 0 Volts) with a high effective birefringence of the variable electrokinetic optic 505 and other orientation states of the charged particles 127A-N with a tower effective birefringence when a higher control voltage is applied.

The controller 1360 also includes a processor, one or more digital storage media, data and programming in the storage and appropriate input/output circuitry. Although other processor based architectures may be used (e.g. architectures built around one or more microprocessors), the example of controller 1360 utilizes a Micro-Control Unit (MCU) 1365, which implements the control logic for the controller 1360 and thus of the system 1345. For example, the MCU 1365 implements the logic for control of operations of the associated optical/electrical apparatus 1350. Although shown as controlling only one such apparatus 1350, the MCU and controller may control a number of such apparatuses 1350.

The MCC 1365 may be a microchip device that incorporates a processor 1366 serving as the programmable central processing unit (CPU) of the MCU 1365 as well as one or more memories, represented by memory 1367 in the drawing. The memory 1367 is accessible to the processor 1366, and the memory or memories 1367 store executable programming for the CPU formed by processor 1366 as well as data for processing by or resulting from processing of the processor 1366. The MCU 1365 may be thought of as a small computer or computer like device formed on a single chip. Such devices are often used as the configurable control elements embedded in special purpose devices rather than in a computer or other general purpose device. A variety of available MCU chips, for example, may be used as the MCU 1365 in the controller 1360 of system 1345.

The MCU 1365 in this example also includes various input and output (I/O) interfaces, shown collectively by way of example as interface 1368 in FIG. 13. The I/O interfaces 1368, for example, support a control output to the EK optic driver 1363 as well as a control output and or input to the driver or sense control circuitry 1361 (for the optical/electrical transducer 1351). The I/O interfaces 1368 also support input/output communications with one or more electronic devices, which may be connected to or incorporated in the system 1345 (e.g. to provide a user interface not shown) or which may be remote.

In the illustrated example, the controller 1360 also includes a communication transceiver (XCVR) 1369 coupled to the processor 1366 (and possibly to the memory 1367) via an I/O interface 1368 of the MCU 1365. Although shown separately, the transceiver 1369 may be implemented in circuity on the same chip as the elements of the MCU 1365. Although the drawing shows only one transceiver 1369, controller 1360 may include any number of transceivers, for example, to support additional communication protocols and/or provide communication over different communication media or channels.

The transceiver 1369 supports communication with other control or processing equipment, for example, with a remote user interface device and/or with a host computer of a building control and automata ion system (BCAS) or the like. The transceiver 1369 may also support system communication with a variety of other equipment of other parties having access to the system 1345 in an overall/networked system encompassing a number of similar systems 1345, e.g. for access to each system 1345 by equipment of a manufacturer for maintenance or access to an on-line server for downloading of programming instructions or configuration data for setting aspects of sensing or lighting operation of the associated optical/electrical apparatus(s) 1350. The circuitry of the transceiver 1369 may support such communication(s) over any available medium, such as wire(s), cable, optical fiber, free-space optical link or radio frequency (RF) link.

The example in FIG. 13 utilizes a MCU 1365, which incorporates, for example, the processor 1366 and memory 1367. As noted, the controller 1360 may use a microprocessor instead of the MCU. A microprocessor based approach typically includes external memory or other data storage device(s) as well as a variety of other system components coupled for local data communication (e.g., via a bus) with the microprocessor. A microprocessor base configuration for the controller 1360 may be similar to that of any of a variety of types of types of other smart electronic devices, such as an architecture for a personal computer or an architecture for a mobile terminal device. The MCU and microprocessor-based approaches are given only by way of non-limiting examples.

As used herein, a processor 1366 is a hardware circuit having elements structured and arranged to perform one or more processing functions, typically various data processing functions. Although discrete logic components could be used, the examples utilize components forming a programmable central processing unit (CPU). A processor for example includes or is part of one or more integrated circuit (IC) chips incorporating the electronic elements to perform the functions of the CPU.

The applicable processor 1366 executes programming or instructions to configure the system 1345 to perform various operations. For example, such operations may include various general operations (e.g., a clock function, recording and logging operational status and/or failure information) as well as various system-specific operations (e.g., controlling beam shaping of input or output light, operation of the transducer(s) and the like) of an optical/electrical apparatus 1350 incorporating one or more of the variable electrokinetic optics and associated transducer(s). Although a processor may be configured by use of hardwired logic, typical processors in lighting devices or in light responsive devices are general processing circuits configured by execution of programming, e.g. instructions and any associated setting data from the memories shown or from other included storage media and/or received from remote storage media. As outlined above, a class of applications of the variable electrokinetic optic 1305 with suitable light source type transducers provide configurable luminaires.

In a first example, the configurable optical/apparatus 1350 is an optical device comprising a plurality of optical-to-electrical transducers 1351. Each optical transducer 1351 is configured to be driven by received light to produce an electrical signal and to be individually activated for outputting the respective electrical signal in response to light. The configurable optical apparatus 1350 further includes a variable electrokinetic optic 1305 positioned over the optical-to-electrical transducers 1351 to direct input light to the optical-to-electrical transducers 1351. Variable electrokinetic optic 1305 includes a transparent input substrate 115 for inside passage of input light rays with an input beam angle. The transparent input substrate 115 includes an input surface coupled to receive the input light rays. The variable electrokinetic optic 1305 further includes 1305 a transparent output substrate 111 located at a distance from the transparent input substrate 115. The transparent output substrate 111 includes an output surface to emit output light rays with an output beam angle to the optical-to-electrical transducers 1351. The variable electrokinetic optic 1305 further includes an electrokinetic fluid 123 between the transparent input substrate and the transparent output substrate, wherein the electrokinetic fluid includes a carrier fluid 126 mixed with charged particles 127A-N. The variable electrokinetic optic 1305 further includes a transparent input substrate electrode 125 on or inside the transparent input substrate 115. The variable electrokinetic optic 1305 further includes a transparent output substrate electrode 113 on the transparent output substrate 111.

The transparent input substrate electrode 126 and the transparent output substrate electrode 113 are configured to generate an electric field in the electrokinetic fluid 123 in response to a control voltage applied across the transparent input substrate electrode 125 and the transparent output substrate electrode 113. The electric field attracts the charged particles 127A-N to adjust an effective birefringence of the variable electrokinetic optic 1305. Increasing the effective birefringence increases the output beam angle of the emitted output light rays relative to the input beam angle. The transparent input substrate 125, the transparent output substrate 111, and the carrier fluid 126 have substantially matching refractive indices. The charged particles 127A-N have a different refractive index than the transparent input substrate 125, the transparent output substrate 111, and the carrier fluid 126. Each optical-to-electrical transducer 1351 is a photo sensor or a photovoltaic device.

In a second example, the system 1345 is a device comprising a variable electrokinetic optic 1305 includes a first transparent substrate 111 including a first surface coupled to receive input light rays with an input beam angle. The variable electrokinetic optic 1305 further includes a second transparent substrate 125 located at a distance from the first transparent substrate 111. The second transparent substrate 125 includes a second surface to emit output light rays with an output beam angle. The variable electrokinetic optic 1305 further includes an electrokinetic fluid 123 between the first transparent substrate 111 and the second transparent substrate 125. The electrokinetic fluid 123 includes a carrier fluid 126 mixed with charged particles 127A-N. The variable electrokinetic optic 1305 further includes a first transparent substrate electrode 113 on the first transparent substrate 111. The variable electrokinetic optic 1305 further includes a second transparent substrate electrode 125 on the second transparent substrate 115. The first transparent substrate electrode 113 and the second transparent substrate electrode 125 are configured to generate an electric field in the electrokinetic fluid 123 in response to a control voltage applied across the first transparent substrate electrode 113 and the second transparent substrate electrode 125. The electric field attracts the charged particles 127A-N to adjust an effective birefringence of the variable electrokinetic optic 1305. Increasing the effective birefringence increases the output beam angle of the emitted output light rays relative to the input beam angle.

The system 1345 includes the variable electrokinetic optic 1305 in combination with a controller 1360 and a plurality of individually operable transducers 1351. The controller 1360 selectively provides control signals to the first transparent substrate electrode and the second transparent substrate electrode to control orientation state of the variable electrokinetic optic. The transducers 1351 are optically coupled to the first surface of the first transparent substrate 111. Each transducer 1351 is of a type capable of being driven by electrical power to emit light or of being driven by light to produce an electrical signal in response to the control signals from the controller 1360. For example, the transducers 1351 are light sources. In another example, the transducers 1351 are optical-to-electrical transducers.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A lighting device comprising:
   a luminaire comprising:
      a light source configured to be driven by electrical power to emit light rays with an input beam angle; and
      a variable electrokinetic optic including:
         a transparent substrate for inside passage of input light rays emitted from the light source, wherein the transparent substrate includes an input surface coupled to receive the input light rays from the light source;
         a diffuser located at a distance from the transparent substrate, wherein the diffuser includes an output surface to emit output light rays for illumination lighting with an output beam angle;
         an electrokinetic fluid between the transparent substrate and the diffuser, wherein the electrokinetic fluid includes a carrier fluid mixed with charged particles;
         a transparent substrate electrode on the transparent substrate;
         a diffuser electrode on or inside the diffuser;
         wherein:
            the transparent substrate electrode and the diffuser electrode are configured to generate an electric field in the electrokinetic fluid in response to a control voltage applied across the transparent substrate electrode and the diffuser electrode;
            the electric field attracts the charged particles to adjust an effective birefringence of the variable electrokinetic optic; and
            increasing the effective birefringence increases the output beam angle of the emitted illumination lighting relative to the input beam angle; and
   a driver circuit coupled to the transparent substrate electrode and the diffuser electrode to selectively control the applied control voltage.

2. The lighting device of claim 1, wherein:
   the transparent substrate, the diffuser, and the carrier fluid have substantially matching refractive indices; and
   the charged particles have a different refractive index than the transparent substrate, the diffuser, and the carrier fluid.

3. The lighting device of claim 1, wherein
   the charged particles include positive charged particles;
   the positive charged particles have a higher refractive index than the carrier fluid;
   the driver circuit selectively controls the applied control voltage to increase the effective birefringence of the variable electrokinetic optic to attain a neutral orientation state such that none of the positive charged particles are attracted to the transparent substrate electrode and the diffuser electrode; and
   the output light rays for illumination lighting from the diffuser are highly diverged relative to the input light rays to increase the output beam angle relative to the input beam angle.

4. The lighting device of claim 3, wherein the positive charged particles are dispersed homogeneously throughout the carrier fluid.

5. The lighting device of claim wherein:
   the charged particles includes positive charged particles;
   the driver circuit selectively controls the applied control voltage to decrease the effective birefringence of the variable electrokinetic optic compared to a neutral orientation state by attracting the positive charged particles to the transparent substrate; and the output light rays for illumination lighting from the diffuser are substantially unchanged relative to the input light rays to substantially maintain the input beam angle as the output beam angle.

6. The lighting device of claim 5, wherein the positive charged particles are dispersed heterogeneously in the carrier fluid.

7. The lighting device of claim 5, wherein the positive charged particles are attracted to the transparent substrate to form a transparent planar surface layer on and parallel to the transparent substrate.

8. The lighting device of claim 1, wherein:
the charged particles include positive charged particles and negative charged particles;
each of the positive charged particles have a substantially identical first refractive index, which is higher than a second refractive index of the carrier fluid;
each of the negative charged particles have a substantially identical third refractive index, which is higher than the second refractive index of the carrier fluid;
the first refractive index and the second refractive index are different relative to each other;
the driver circuit selectively controls the applied control voltage to increase the effective birefringence of the variable electrokinetic optic to attain a neutral orientation state such that none of the positive charged particles and the negative charged particles are attracted to the transparent substrate electrode and the diffuser electrode; and
the output light rays for illumination lighting from the diffuser are highly diverged relative to the input light rays to increase the output beam angle relative to the input beam angle.

9. The lighting device of claim 1, wherein:
the charged particles include positive charged particles and negative charged particles with refractive indices higher than the carrier fluid;
the applied control voltage decreases the effective birefringence of the variable electrokinetic optic compared to a neutral orientation state by attracting the negative charged particles to the transparent substrate and attracting the positive charged particles to the diffuser substrate; and
the output light rays for illumination lighting from the diffuser are intermediately diverged relative to the input light rays to increase the output beam angle relative to the input beam angle.

10. The lighting device of claim 9, wherein:
the positive charged particles have reduced mobility relative to the negative charged particles; and
the negative charged particles are attracted to the transparent substrate to form a transparent surface layer parallel to and on the transparent substrate.

11. The lighting device of claim 1, wherein:
the charged particles include positive charged particles and negative charged particles;
the transparent substrate includes a patterned film that includes a raised grid electrode on top of an insulating layer, wherein the insulating layer electrically separates the raised grid electrode from the transparent substrate electrode;
the patterned film includes openings to the transparent substrate electrode below; and each of the openings forms a respective well that includes the electrokinetic fluid in contact with the transparent substrate electrode on a bottom of the respective well.

12. The lighting device of claim 11, wherein:
the driver circuit selectively controls the applied control voltage to increase the effective birefringence of the variable electrokinetic optic to attain a neutral orientation state such that none of the positive charged particles and the negative charged particles are attracted to the transparent substrate electrode, the raised grid electrode, and the diffuser electrode; and
the output light rays for illumination lighting from the diffuser are highly diverged relative to the input light rays to increase the output beam angle relative to the input beam angle.

13. The lighting device of claim wherein:
the driver circuit selectively controls the applied control voltage to decrease the effective birefringence of the variable electrokinetic optic compared to a neutral orientation state by attracting the negative charged particles to the raised grid electrode; and
the output light rays for illumination lighting from the diffuser are upper intermediately diverged relative to the input light rays to increase the output beam angle relative to the input beam angle.

14. The lighting device of claim 11, wherein:
the driver circuit selectively controls the applied control voltage to decrease the effective birefringence of the variable electrokinetic optic compared to a neutral orientation state by attracting the negative charged particles to the transparent substrate electrode; and
the output light rays for illumination lighting from the diffuser are lower intermediately diverged relative to the input light rays to increase the output beam angle relative to the input beam angle.

15. The lighting device of claim 14, wherein:
the positive charged particles have reduced mobility relative to the negative charged particles; and
the negative charged particles are attracted to the transparent substrate electrode to form a transparent planar surface layer on the bottom of the respective well.

16. The lighting device of claim 11, wherein:
the driver circuit selectively controls the applied control voltage to decrease the effective birefringence of the variable electrokinetic optic compared to a neutral orientation state by attracting the positive charged particles to the raised grid electrode and attracting the negative charged particles to the transparent substrate electrode; and
the output light rays for illumination lighting from the diffuser are substantially unchanged relative to the input light rays to maintain the input beam angle as the output beam angle.

17. The lighting device of claim 16, wherein:
the positive charged particles are attracted to the raised grid electrode to form a first transparent planar surface layer on the raised grid electrode; and
the negative charged particles are attracted to the transparent substrate electrode to form a second transparent planar surface layer on the bottom of each well.

18. The lighting device of claim 1, wherein:
the variable electrokinetic optic includes a non-uniform gap formed between the diffuser and the transparent substrate;
the diffuser includes a micro-structure diffuser; and
the electrokinetic fluid fills the non-uniform gap.

19. The lighting device of claim 18, wherein the microstructure diffuser includes a diffuser film comprising a transparent diffuser substrate and convex micro-structure features extending outward from the transparent diffuser substrate toward the non-uniform gap.

20. The lighting device of claim 18, wherein:
the luminaire further comprises a reflector coupled to the micro-structure diffuser; and
the diffuser electrode is formed on surfaces of microstructure features of the micro-structure diffuser facing the non-uniform gap.

21. An optical device comprising:
a plurality of optical-to-electrical transducers, each optical transducer being configured to be driven by received light to produce an electrical signal and to be individually activated for outputting the respective electrical signal in response to light;
a variable electrokinetic optic positioned over the optical-to-electrical transducers to direct input light to the optical-to-electrical transducers, the variable electrokinetic optic including:
a transparent input substrate for inside passage of input light rays with an input beam angle, wherein the transparent input substrate includes an input surface coupled to receive the input light rays;
a transparent output substrate located at a distance from the transparent input substrate, wherein the transparent output substrate includes an output surface to emit output light rays with an output beam angle to the optical-to-electrical transducers;
electrokinetic fluid between the transparent input substrate and the transparent output substrate, wherein the electrokinetic fluid includes a carrier fluid mixed with charged particles;
a transparent input substrate electrode on or inside the transparent input substrate; and
a transparent output substrate electrode on the transparent output substrate;
wherein:
the transparent input substrate electrode and the transparent output substrate electrode are configured to generate an electric field in the electrokinetic fluid in response to a control voltage applied across the transparent input substrate electrode and the transparent output substrate electrode;
the electric field attracts the charged particles to adjust an effective birefringence of the variable electrokinetic optic; and
increasing the effective birefringence increases the output beam angle of the emitted output light rays relative to the input beam angle.

22. The optical device of claim 21, wherein:
the transparent input substrate, the transparent output substrate, and the carrier fluid have substantially matching refractive indices; and
the charged particles have a different refractive index than the transparent input substrate, the transparent output substrate, and the carrier fluid.

23. The optical device of claim 2 wherein each optical-to-electrical transducer is a photo sensor or a photovoltaic device.

24. A variable electrokinetic optic comprising:
a first transparent substrate including a first surface coupled to receive input light rays with an input beam angle;
a second transparent substrate located at a distance from the first transparent substrate, the second transparent substrate including a second surface to emit output light rays with an output beam angle;
an electrokinetic fluid between the first transparent substrate and the second transparent substrate, wherein the electrokinetic fluid includes a carrier fluid mixed with charged particles;
a first transparent substrate electrode on the first transparent substrate;
a second transparent substrate electrode on the second transparent substrate;
wherein:
the first transparent substrate electrode and the second transparent substrate electrode are configured to generate an electric field in the electrokinetic fluid in response to a control voltage applied across the first transparent substrate electrode and the second transparent substrate electrode;
the electric field attracts the charged particles to adjust an effective birefringence of the variable electrokinetic optic; and
increasing the effective birefringence increases the output beam angle of the emitted output light rays relative to the input beam angle.

25. A device comprising the variable electrokinetic optic of claim 24, in combination with:
a controller to selectively provide control signals to the first transparent substrate electrode and the second transparent substrate electrode to control orientation state of the variable electrokinetic optic; and
a plurality of individually operable transducers optically coupled to the first surface of the first transparent substrate, each transducer being of a type capable of being driven by electrical power to emit light or of being driven by light to produce an electrical signal in response to the control signals from the controller.

26. The device of claim 24, wherein the transducers are light sources.

27. The device of claim 24, wherein the transducers are optical-to-electrical transducers.

* * * * *